(12) United States Patent
Misawa et al.

(10) Patent No.: US 11,678,049 B2
(45) Date of Patent: *Jun. 13, 2023

(54) IMAGE DISPLAY APPARATUS, IMAGE-TAKING APPARATUS AND IMAGE DISPLAY METHOD

(71) Applicant: FUJIFILM Corporation, Tokyo (JP)

(72) Inventors: Takeshi Misawa, Asaka (JP); Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,356

(22) Filed: Nov. 2, 2021

(65) Prior Publication Data

US 2022/0060636 A1 Feb. 24, 2022

Related U.S. Application Data

(60) Continuation of application No. 17/067,292, filed on Oct. 9, 2020, now Pat. No. 11,196,933, which is a
(Continued)

(30) Foreign Application Priority Data

Mar. 30, 2006 (JP) .............................. JP2006-095816

(51) Int. Cl.
*H04N 23/63* (2023.01)
*H04N 23/61* (2023.01)
*H04N 23/611* (2023.01)

(52) U.S. Cl.
CPC ........... *H04N 23/635* (2023.01); *H04N 23/61* (2023.01); *H04N 23/611* (2023.01)

(58) Field of Classification Search
CPC ......... H04N 5/232945; H04N 5/23218; H04N 5/23219; H04N 5/23293; H04N 5/232933;
(Continued)

(56) References Cited

U.S. PATENT DOCUMENTS 6,686,592 B1 2/2004 Sakairi et al.
6,983,420 B1 1/2006 Itou et al.
(Continued)

FOREIGN PATENT DOCUMENTS

JP 2004-46591 A 2/2004
JP 2004-242010 A 8/2004
(Continued)

OTHER PUBLICATIONS

"Intelligent announced equipped with the new "ASIMO" technology," Honda Press Information, 2002, Internet Archive Wayback Machine, Japanese language document with English translation, 6 pages.

*Primary Examiner* — Jeffery A Brier
(74) *Attorney, Agent, or Firm* — Birch, Stewart, Kolasch & Birch, LLP

(57) ABSTRACT

The image display apparatus according to an aspect of the present invention comprises: an image input device which inputs an image signal; a particular target detection device which detects a particular target included in the image signal based on a particular target evaluation value indicating the feature of the particular target; a frame display information generation device which generates frame display information indicating a frame surrounding the detected particular target and which causes the frame to change continuously or by stages according to the particular target evaluation value; and a display device which displays the frame based on the generated frame display information. That is, by causing the frame to change continuously or by stages according to the evaluation value of a particular target, it is possible to avoid sudden change in the frame display.

6 Claims, 34 Drawing Sheets

Related U.S. Application Data continuation of application No. 16/701,958, filed on Dec. 3, 2019, now Pat. No. 10,841,499, which is a continuation of application No. 15/642,646, filed on Jul. 6, 2017, now Pat. No. 10,554,894, which is a division of application No. 14/198,358, filed on Mar. 5, 2014, now Pat. No. 9,736,379, which is a division of application No. 11/730,140, filed on Mar. 29, 2007, now Pat. No. 8,704,856.

(58) Field of Classification Search
CPC ....... H04N 5/232939; H04N 5/232941; H04N 23/635; H04N 23/61; H04N 23/611; G06T 11/60

See application file for complete search history.

(56) References Cited

U.S. PATENT DOCUMENTS

| | | | |
|---|---|---|---|
| 7,014,102 | B2 | 3/2006 | Oohashi |
| 7,015,934 | B2 | 3/2006 | Toyama et al. |
| 7,376,347 | B2 | 5/2008 | Sugimoto |
| 7,672,580 | B2 | 3/2010 | Saga |
| 8,704,856 | B2 | 4/2014 | Misawa et al. |
| 9,736,379 | B2 | 8/2017 | Misawa et al. |
| 10,554,894 | B2 | 2/2020 | Misawa et al. |
| 10,841,499 | B2 | 11/2020 | Misawa et al. |
| 11,196,933 | B2 * | 12/2021 | Misawa .............. H04N 5/23219 |
| 2002/0054047 | A1 | 5/2002 | Toyama et al. |
| 2005/0219395 | A1 | 10/2005 | Sugimoto |
| 2006/0087520 | A1 | 4/2006 | Ito et al. |
| 2006/0210264 | A1 | 9/2006 | Saga |
| 2007/0030375 | A1 | 2/2007 | Ogasawara |

FOREIGN PATENT DOCUMENTS

| | | |
|---|---|---|
| JP | 2004-310702 A | 11/2004 |
| JP | 2004-318269 A | 11/2004 |
| JP | 2005-033714 A | 2/2005 |
| JP | 2005-284203 A | 10/2005 |
| JP | 2005-286940 A | 10/2005 |
| JP | 2005-318515 A | 11/2005 |

* cited by examiner

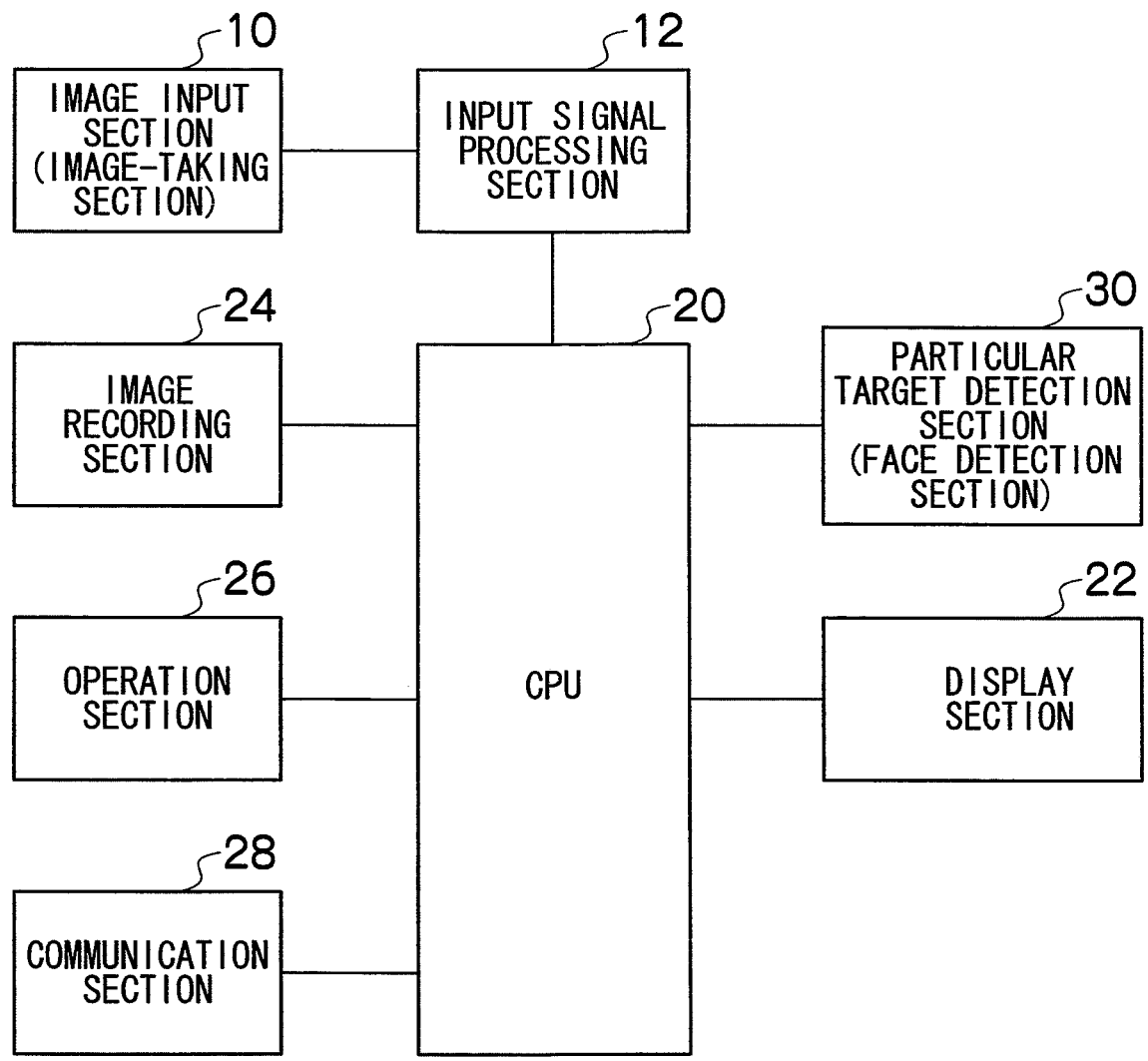

FIG.3

| DETECTION RESULT | STANDARDIZED FACE EVALUATION VALUE | FRAME POSITION INFORMATION | | | |
|---|---|---|---|---|---|
| | | X1 | Y1 | X2 | Y2 |
| 1 | 95 | 100 | 120 | 240 | 120 |
| 2 | 90 | 480 | 80 | 580 | 80 |
| 3 | 88 | 320 | 200 | 410 | 220 |
| ... | ... | ... | ... | ... | ... |

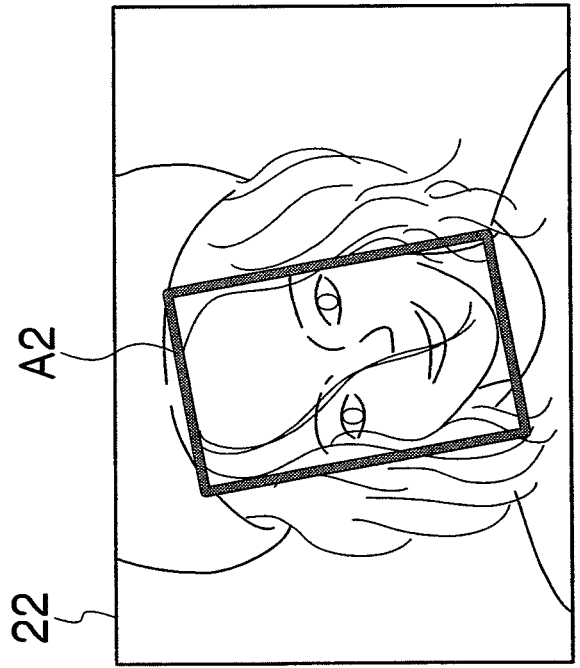
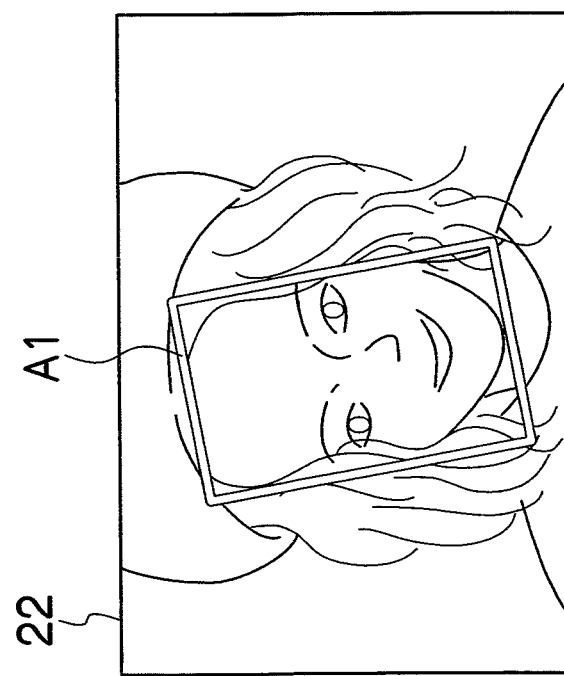

FIG.5

| FACE EVALUATION VALUE | STANDARDIZATION 1 | STANDARDIZATION 2 | STANDARDIZATION 3 |
|---|---|---|---|
| 0<br>9<br>10<br>100 | 255<br>232<br>229<br>0 | 100<br>91<br>90<br>0 | 0<br>50<br>52<br>100 |

IN THE CASE WHERE SCALE IS PREPARED FOR EACH COLOR

IN THE CASE WHERE ONE SCALE IS PREPARED AND FRAMES ARE DISPLAYED IN DIFFERENT COLORS

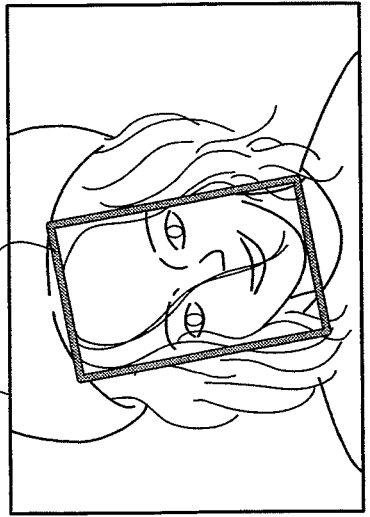

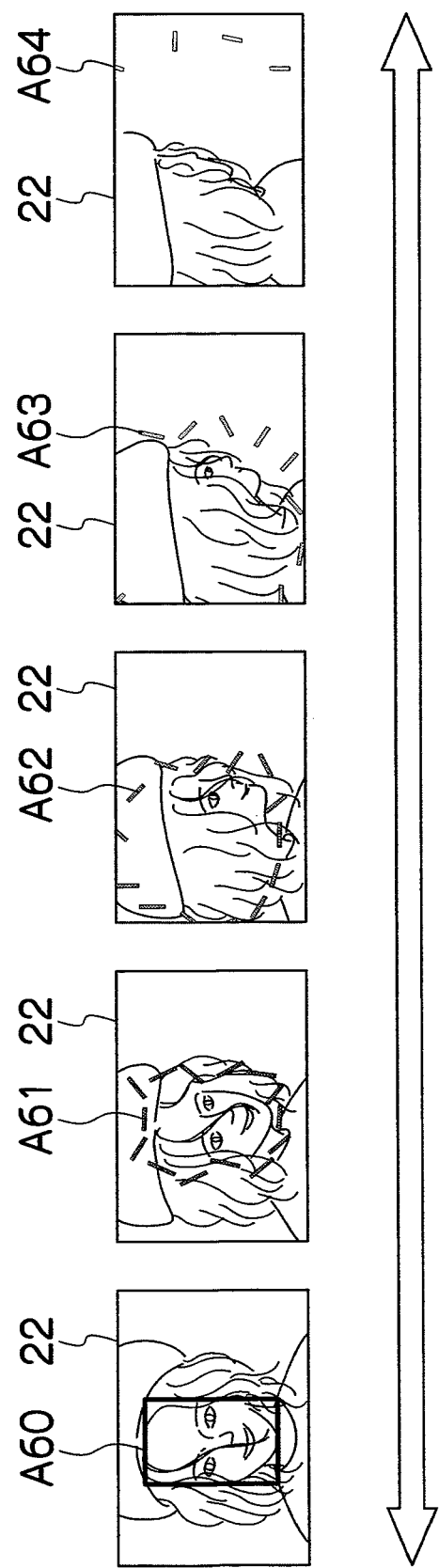

DISPLAY IN WHICH FACE
HAS BEEN DETECTED

DISPLAY IN WHICH FACE
HAS NOT BEEN DETECTED

RELATED ART

IMAGE DISPLAY APPARATUS, IMAGE-TAKING APPARATUS AND IMAGE DISPLAY METHOD

CROSS-REFERENCE TO RELATED APPLICATIONS

This application is a Continuation of U.S. Ser. No. 17/067,292 filed on Oct. 9, 2020, which is a Continuation of U.S. Ser. No. 16/701,958 filed Dec. 3, 2019 (now U.S. Pat. No. 10,841,499 issued Nov. 17, 2020), which is a Continuation of U.S. application Ser. No. 15/642,646 filed Jul. 6, 2017 (now U.S. Pat. No. 10,554,894 issued Feb. 4, 2020), which is a Divisional of U.S. application Ser. No. 14/198,358 filed Mar. 5, 2014 (now U.S. Pat. No. 9,736,379 issued on Aug. 15, 2017), which is a Divisional of U.S. application Ser. No. 11/730,140 filed on Mar. 29, 2007 (now U.S. Pat. No. 8,704,856 issued on Apr. 22, 2014), which claims priority under 35 U.S.C. § 119(a) to Application No. 2006-095816 filed in Japan on Mar. 30, 2006, all of which are hereby expressly incorporated by reference into the present application.

BACKGROUND OF THE INVENTION

Field of the Invention

The present invention relates to an image display apparatus, an image-taking apparatus and an image display method, and in particular to a technique for displaying information indicating a particular area included in an image.

Description of the Related Art

Here, an image-taking apparatus (a digital camera) will be described as a conventional art for a display apparatus and an image-taking apparatus. Digital cameras which can detect a particular area (a face) from a subject image have been put to practical use. Such digital cameras can detect a face and perform automatic focus control (AF) and automatic exposure control (AE) for the face area to obtain a subject image with an appropriate focus and exposure even when it is difficult to perform AF and AE by normal image-taking. Furthermore, when a face is detected, a frame is displayed for the detected area, so that an operator can determine whether or not the digital camera has detected a face.

In Japanese Patent Application Laid-Open No. 2005-286940, a digital camera is disclosed which makes it possible to detect a face area existing in a subject image obtained by image taking and let the user know the face area when he performs image taking. AF and AE are performed with the use of the image data indicating the image within a frame. It is possible to record image data indicating a subject image in which the face area is appropriately focused and which has appropriate brightness.

In Japanese Patent Application Laid-Open No. 2005-284203, a digital camera is disclosed which detects a face area existing in a subject image obtained by image taking, and which is provided with a lens control device that controls a lens driving circuit to position a lens at a position where a face evaluation value becomes the largest.

SUMMARY OF THE INVENTION

In these digital cameras, an operator can determine whether or not the digital camera has detected a face from the display of the frame. However, in the case where the detection situation suddenly changes, the frame may be suddenly displayed or hidden. For example, in the case of taking a portrait as shown in FIGS. 34A and 34B, a face is detected and a frame is displayed when hair flowing in the wind is not over an eye as in FIG. 34A. However, when hair flowing in the wind is over an eye as in FIG. 34B, the face is not detected because the one eye is not detected, and the frame is not displayed. If this situation is repeated, the frame blinks. Similarly, in the case of taking an image of a child who does not keep still, the frame blinks annoyingly.

In the technique described in Japanese Patent Application Laid-Open No. 2005-284203, the lens is moved so that the face evaluation value becomes the largest so that the face of a person is focused. It is not a technique for letting an operator know the face area when he performs image taking.

The present invention has been made in consideration of the above situation, and its object is to provide an image display apparatus, an image-taking apparatus, and an image display method which are capable of improving the conventional frame display in which only distinction between display and non-display is made and preventing annoying display as far as possible, by causing a frame surrounding a particular target to change continuously or by stages according to particular target evaluation value.

The image display apparatus according to a first aspect of the present invention comprises: an image input device which inputs an image signal; a particular target detection device which detects a particular target included in the image signal based on a particular target evaluation value indicating a feature of the particular target; a frame display information generation device which generates a frame display information indicating a frame surrounding the detected particular target and which causes the frame to change continuously or by stages according to the particular target evaluation value; and a display device which displays the frame based on the generated frame display information.

That is, by causing the frame to change continuously or by stages according to the evaluation value of a particular target, it is possible to avoid sudden change in the frame display.

The image display apparatus according to a second aspect of the present invention is the image display apparatus according to the first aspect, wherein the frame display information generation device generates the frame display information which causes at least any of a shade intensity of a frame line, a hue of a frame line, a line segment display rate of line segments constituting a frame line and a frame line width, of the frame to change according to the particular target evaluation value.

That is, due to the graphical change in the frame display, such as change in the shade intensity of the frame line, change in the hue of the frame line, change in the line segment display rate of the line segments constituting the frame line and change in the frame line width, it is possible to avoid sudden change in the frame display. The line segment display rate of the frame line refers to, when the frame line is indicated by a dashed line (a dotted line), the ratio of the length of one dash (dot) to the interval between its one end and the same-side end of an adjacent dash (dot). If the entire frame line is indicated by a solid line, the line segment display rate is 100%.

The image display apparatus according to a third aspect of the present invention is the image display apparatus according to the first aspect, wherein the frame display information generation device generates the frame display information which causes a temporal display rate of a frame line of the frame to change according to the particular target evaluation value.

That is, by causing the temporal display rate of the frame (the ratio of the frame line display time to a unit time) to change according to the particular target evaluation value, it is possible to avoid sudden change in the frame display.

The image display apparatus according to a fourth aspect of the present invention is the image display apparatus according to the first or second aspect, wherein an indicator which shows correspondence between a display of the frame and the particular target evaluation value is further displayed on the display device.

That is, the particular target evaluation value can be known from the display of the frame.

The image display apparatus according to a fifth aspect of the present invention is the image display apparatus according to any of the first to fourth aspects, wherein a display which indicates the particular target evaluation value is further shown on the display device.

That is, the particular target evaluation value can be known more specifically.

The image display apparatus according to a sixth aspect of the present invention is the image display apparatus according to any of the first to fifth aspects, wherein when multiple particular targets are included in the image signal, the frame display information generation device generates the frame display information which indicates each of frames surrounding the particular targets with use of each of at least two different colors.

That is, when there are multiple particular targets, the particular target evaluation value of each particular target can be identified.

The image display apparatus according to a seventh aspect of the present invention comprises: an image input device which inputs an image signal; a particular target detection device which detects a particular target included in the image signal based on a particular target evaluation value thereof; a frame display information generation device which generates a frame display information indicating a frame surrounding the detected particular target; and a display device which synthesizes and displays, on the image, the frame based on the generated frame display information together with a numerical value indicating the particular target evaluation value.

That is, the particular target evaluation value can be directly known as a numeral.

The image display apparatus according to an eighth aspect of the present invention is the image display apparatus according to any of the first to seventh aspects, further comprising a display determination device which determines whether or not to display the frame based on the particular target evaluation value, wherein the frame is displayed when the particular target evaluation value is equal to or above a predetermined display determination value.

That is, by not displaying the frame when the evaluation value of the particular target is low, only necessary frame display can be shown.

The image display apparatus according to a ninth aspect of the present invention comprises: an image input device which inputs an image signal; a particular target detection device which detects a particular target included in the image signal based on a particular target evaluation value indicating a feature of the particular target; a frame display information generation device which generates a frame display information indicating a frame surrounding the detected particular target; a display device which displays the frame based on the generated frame display information; and a display determination device which displays the frame when the particular target evaluation value is equal to or above a predetermined display determination value; and the frame display information generation device generates the frame display information so that the frame gradually disappears with a lapse of time when it is determined by the display determination device to switch from display to non-display of the frame, and the frame gradually appears with a lapse of time when it is determined to switch from non-display to display of the frame.

That is, if it is determined by the display determination device to switch from display to non-display of the frame indicating the particular target, the frame surrounding the detected particular target is displayed in a manner that it gradually disappears with a lapse of time, and thereby sudden change in the frame display can be avoided. Furthermore, if it is determined by the display determination device to switch from non-display to display of the frame indicating the particular target, the frame is displayed in a manner that it gradually appears with a lapse of time, and thereby sudden change in the frame display can be avoided.

The image display apparatus according to a tenth aspect of the present invention is the image display apparatus according to the ninth aspect, wherein the frame display information generation device generates the frame display information which causes at least any of a shade intensity of a frame line, a line segment display rate of line segments constituting a frame line, a frame line width, a display magnification rate of the frame and a temporal display rate of a frame line to change according to a lapse of time from a point of time when a determination to switch from display to non-display is made or a point of time when a determination to switch from non-display to display is made.

That is, by the frame display information generation device causing at least any of the shade intensity of the frame line, the line segment display rate of the line segments constituting the frame line, the frame line width, the display magnification rate of the frame and the temporal display rate of the frame line to change according to the lapse of time from the point of time when the determination to switch from display to non-display is made or the point of time when the determination to switch from non-display to display is made, sudden change in the frame display can be avoided.

The image display apparatus according to an eleventh aspect of the present invention is the image display apparatus according to the ninth aspect, wherein the frame display information generation device generates the frame display information which causes an in-screen display rate of the multiple line segments constituting a frame line of the frame to change according to the lapse of time from the point of time when the determination to switch from display to non-display is made or the point of time when the determination to switch from non-display to display is made.

That is, by the frame display information generation device causing the in-screen display rate of the multiple line segments constituting the frame line of the frame to change according to the lapse of time from the point of time when the determination to switch from display to non-display is made or the point of time when the determination to switch from non-display to display is made, sudden change in the frame display can be avoided.

The image display apparatus according to a twelfth aspect of the present invention is the image display apparatus according to the eleventh aspect, wherein the frame display information generation device generates the frame display information which causes the distance of each of the multiple line segments constituting the frame line of the frame from the center of the frame to change according to the lapse of time.

That is, by the frame display information generation device causing the in-screen display rate of the multiple line segments constituting the frame line of the frame to change according to the lapse of time from the point of time when the determination to switch from display to non-display is made or the point of time when the determination to switch from non-display to display is made, sudden change in the frame display can be avoided. It is assumed that the in-screen display rate of the frame is 0%, for example, when the frame is displayed in a manner that multiple line segments constituting the frame line are separated and spread almost radially, with a particular target as the center, and gradually moved beyond the screen or when the frame is displayed in a manner that the line segments are moved toward the center of a particular target to gradually come together.

The image display apparatus according to a thirteenth aspect of the present invention is the image display apparatus according to any of the eighth to twelfth aspects, wherein the apparatus accepts an input of the display determination value by an operator.

That is, by an operator inputting the evaluation value of the particular target for which a frame is to be displayed, only necessary frame display can be shown.

The image display apparatus according to a fourteenth aspect of the present invention is the image display apparatus according to any of the first to thirteenth aspects, wherein the display device displays an image based on the image signal, and synthesizes and displays the frame on the image.

That is, by synthesizing and displaying an image and a frame, a target detected by the particular target detection device can be easily confirmed.

The image display apparatus according to a fifteenth aspect of the present invention is the image display apparatus according to any of the first to fourteenth aspects, wherein the particular target is a face, and the particular target detection device is a face detection device.

That is, a display apparatus capable of avoiding sudden change in the display of the frame indicating a face can be realized.

The image display apparatus according to a sixteenth aspect of the present invention comprises: the image display apparatus according to any of the first or fifteenth aspects; and an image-taking device which functions as the image input device.

That is, an image-taking apparatus capable of avoiding sudden change in the display of the frame indicating the particular target can be realized.

The image display method according to a seventeenth aspect of the present invention comprises: obtaining an image signal indicating a subject image; detecting a particular target included in the image signal based on a particular target evaluation value indicating a feature of the particular target; generating a frame display information indicating a frame surrounding the detected particular target; and displaying the frame display information indicating the frame which is caused to change continuously or by stages according to the particular target evaluation value, on a display device.

The image display method according to an eighteenth aspect of the present invention comprises: obtaining an image signal indicating a subject; detecting a particular target included in the image signal based on a particular target evaluation value indicating a feature of the particular target; generating a frame display information indicating a frame surrounding the detected particular target; determining whether or not to display the frame according to the particular target evaluation value; and generating the frame display information so that the frame gradually disappears with a lapse of time when it is determined to switch from display to non-display of the frame, and the frame gradually appears with a lapse of time when it is determined to switch from non-display to display of the frame, and displaying the frame based on the frame display information.

The image display method according to a nineteenth aspect of the present invention is the image display method according to the seventeenth or eighteenth aspect, wherein the frame is synthesized and displayed on the image based on the image signal and the frame display information.

According to the present invention, it is possible to provide an image display apparatus, an image-taking apparatus, and an image display method which are capable of improving the conventional frame display in which only distinction between display and non-display is made and preventing annoying display as far as possible, by causing a frame surrounding a particular target to change continuously or bay stages according to particular target evaluation value.

BRIEF DESCRIPTION OF THE DRAWINGS

FIG. 1 is a block diagram showing an example of the internal configuration of an image display apparatus according to the present invention;

FIG. 3 is a table showing a standardized face evaluation value and position information about a frame indicating a face which is obtained from the detection position and the parameter detection positions, the standardized face evaluation value and the position information being outputted from an output device;

FIGS. 4A and 4B show an example of a CPU generating a frame display indicating a face, from the standardized face evaluation value and the position of the frame indicating a face, outputted from the face detection section, and displaying it on a display section;

FIG. 5 shows an example of a table for standardizing the face evaluation value;

FIGS. 12A, 12B and 12C show an example where, when the frame is displayed continuously or by stages according to the face evaluation value, the hue of the frame is changed according to the face evaluation value;

FIG. 32 shows an example where, when the face evaluation value becomes equal to or above the display determination value of the frame indicating a face or below the value, the frame is changed with the lapse of time with the use of multiple means;

DETAILED DESCRIPTION OF THE PREFERRED EMBODIMENT

Figure 2B:
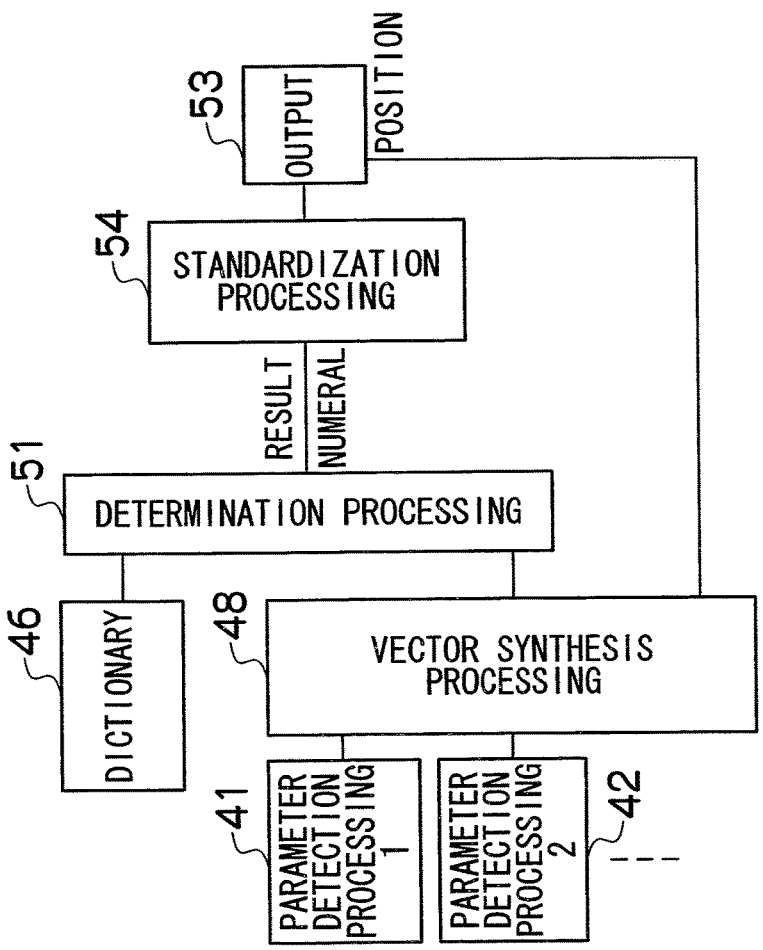
FIGS. 2A and 2B are block diagrams showing a detailed embodiment of a face detection section in FIG. 1.

An embodiment of an image display apparatus, an image-taking apparatus and an image display method according to the present invention will be described with reference to accompanying drawings.

FIG. 1 is a block diagram showing an example of the internal configuration of an image-taking apparatus 1 as an embodiment of an image display apparatus according to the present invention.

In this figure, an image-taking apparatus 1 is configured by an image input section 10, an input signal processing section 12, a CPU 20, a display section 22, an image recording section 24, an operation section 26, a communication section 28 and a particular target detection section (face detection section) 30. The CPU 20 controls each of the blocks in response to an operator's instruction from the operation section 26 or the communication section 28.

When the image input section 10 is configured as an image-taking section, the image input section 10 coverts an optical image coming from the outside to an image signal with the use of a lens, an image-taking element and the like and outputs it. A device for a flash or illumination to be used as an auxiliary light in the case of a low illuminance may be provided. When the image input section 10 is configured as an external signal input section for inputting an image signal from the outside, the configuration of the image input section 10 may be overlapped with the configuration of the image recording section 24 or the communication section 28. That is, an image is inputted with the use of the recording medium interface of the image recording section 24 or the communication section 28. In addition, an auxiliary light section for emitting an auxiliary light as necessary, a speaker section for reproducing voice or giving an alarm sound and the like are also provided though they are not shown.

The input signal processing section 12 processes the image signal and hands it to the CPU 20. The signal processing performed here differs depending on the output image signal form required by an operator. Offset correction processing, white balance processing, color matrix processing, tone conversion processing, demosaicking processing, outline enhancement processing, compression processing and the like are performed for the image signal according to image-taking modes. The image-taking modes include a still-image taking mode, a motion-picture taking mode and a through-image display mode which is the stage of preparation for these image-taking modes. Furthermore, the still-image taking mode is further separated in a compression recording mode and a non-compression recording mode. The non-compression recording mode is further separated in a RAW image recording mode and a non-compression image format recording mode. The through image display mode, which is to be described in detail later, causes the image input section 10 to continuously output images, causes the input signal processing section 12 to perform signal processing of the outputted continuous images and outputs the images in an output format corresponding to the display form of the display section 22. Thereby, through images are continuously displayed on the display section 22.

The image recording section 24 records an inputted image signal. As a medium for recording, either an internal recording medium or an external recording medium like a memory card may be used. Both of them may exist. Not only an image but also inputted or generated information (data) can be recorded in the recording medium. In spite of the name of the recording section, it can perform not only storage but also reading. Data read therefrom can be transmitted from the communication section 28 or displayed on the display section 22, via the CPU 20.

The operation section 26 is configured by a power source switch and operation switches for operating the image-taking apparatus 1. An operator can operate the image-taking apparatus 1 by giving an instruction to the image-taking apparatus 1 from the operation section 26.

The communication section 28 is a device for the image-taking apparatus 1 to communicate with the outside. As a communication method, wired communication, wireless communication, optical communication or the like can be used depending on the situation. A communication protocol can be selected depending on the situation. The communication section 28 can not only transmit information to the outside but also receive information from the outside.

The particular target detection section (face detection section) 30 detects particular targets of a subject, that is, the face, eyes, pupils, nose, mouth and the like from a through image or a recorded image and identifies their feature points and patterns to detect the face of the subject. As a specific face detection method, a well-known method can be used, such as a method for detecting a face by detection of an edge or detection of a form pattern, a feature point vector approximation method in which the feature points of each particular target described above are vectorized to detect approximation of the feature point vectors, and a method for detecting a face by detection of the hue or detection of the flesh color.

When detecting the face of a person, the face detection section 30 outputs information indicating the display area of the face to the CPU 20 together with a face evaluation value, and it can display a frame indicating the display area and accompanying information on the display section 22 as necessary.

Figure 2A:
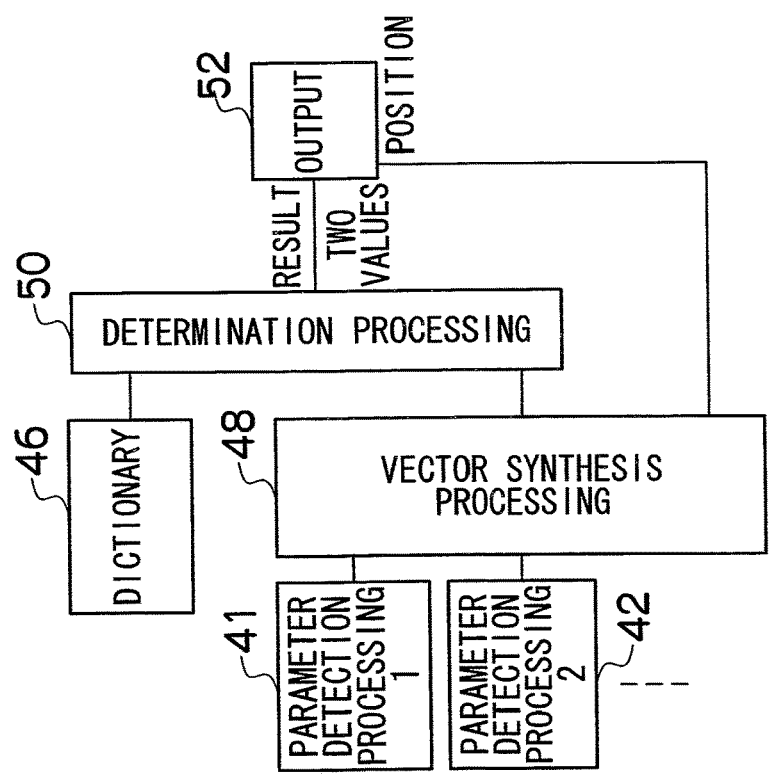

Here, the details of the face detection section 30 will be described with the use of the feature point vector approximation method described above as an example. FIGS. 2A and 2B show the example of the feature point vector approximation method.

FIG. 2A is a block diagram showing an embodiment of the face detection section 30 capable of detecting a face and outputting the result about whether a face has been detected or not and the display position and size of a frame. While moving the detection position, each of parameter detection processing devices 41 and 42 detects a different parameter from an input image signal. A vector synthesis processing device 48 synthesizes the detected parameters to generate a vector. For example, if eight kinds of parameters are detected, an eight-dimensional vector is synthesized. A determination processing device 50 compares the synthesized vector and a reference vector stored in a dictionary 46, and, if the difference is equal to or below a predetermined value, it determines that a face has been detected. It is desirable that multiple reference vectors are stored according to face features. After the determination, the result about whether or not it has been determined that a face has been detected and the position of a frame indicating the face obtained from the detection position and the parameter detection positions are outputted from an output device 52.

FIG. 2B is a block diagram showing an embodiment of the face detection section 30 capable of detecting a face and outputting a standardized face evaluation value of a detected face and the display position and size of a frame. Since the sections responsible for steps to the step of generating a vector are the same as those in FIG. 2A, description thereof will be omitted. A determination processing device 51 compares the synthesized vector and a reference vector stored in the dictionary 46, and determines the difference between the vectors to be a face evaluation value, as an absolute value. If there are multiple reference vectors, a value obtained by further performing synthesis of a vector (sum of squares) of the differences between the respective reference vectors and the synthesized vector is set as the face evaluation value. That is, if the synthesized vector ideally corresponds to the reference vector, 0 is outputted. After the calculation of the face evaluation value, the face evaluation value is sent to a standardization processing device 54, and the standardized face evaluation value and the position of the frame indicating a face obtained from the detection position and the parameter detection positions are outputted from an output device 53. It is desirable to appropriately select a method for the standardization according to the method for displaying a frame to be displayed which is to be described alter. In this embodiment, description will be made on the assumption that the face detection section shown in FIG. 2B is used. In FIGS. 2A and 2B, the respective processing sections are separated. However, it is also possible that the CPU 20 performs all the processing of the face detection section. In this case, everything is to be processed by software.

FIG. 3 shows the standardized face evaluation value and position information about the frame indicating a face obtained from the detection position and the parameter detection positions, outputted from an output device 53. Here, the frame position information is assumed to be a rectangle frame, and the coordinates of the four corners are outputted. However, it is also possible to output the coordinates of any corner of the frame, the frame size, the inclination and the like. A frame in a shape other than a rectangle is also possible. The output method in such a case will be appropriately selected. FIG. 3 shows detection results 1, 2 and 3, which indicates that the faces of three people have been detected.

Next, detailed description will be made on the operation of displaying the frame indicating a face on the display section 22 of the image-taking apparatus 1.

First Embodiment of Frame Display

FIGS. 4A and 4B show an example of the CPU 20 generating a frame display indicating a face, from the standardized face evaluation value and the position of a frame indicating a face, outputted from the face detection section 30, and displaying it on the display section 22. Here, the face evaluation value is indicated by the shade intensity of the frame line. That is, when the face evaluation value is small, the frame line is displayed (A1) with a low shade intensity as shown in FIG. 4A (displayed in white in the figure), and when the face evaluation value is large, the frame line is displayed (A2) with a high shade intensity as shown in FIG. 4B (displayed in black in the figure). When a frame line is displayed in grayscale, the shade intensity of the frame line corresponds to the face evaluation value, and when the frame line is displayed in color, the shade intensity of at least any of the color components constituting the frame line may correspond to the face evaluation value.

When the display section 22 is capable of displaying, for example, 8-bit image data, it is recommended to use standardization 1 in the standardization table in FIG. 5 to display the face evaluation value and the standardized face evaluation value as described above. That is, when the face evaluation value is 0, the output of the standardization 1 is 255. If the frame line is displayed in grayscale, then the frame line is displayed by 255, that is, in white. If the frame line is displayed in green, then the frame line is displayed in deep green because green is indicated by 255 and other colors are indicated by 0. When the face evaluation value is 100, the output of the standardization 1 is 0. If the frame line is displayed in grayscale, then the frame line is displayed by 0, that is, in black. If the frame line is displayed in green, the frame line is also displayed in black because both of green and other colors are indicated by 0. The evaluation value is between 0 and 100 here. However, this value differs according to the configuration of the face detection section. Similarly, the standardization table also differs according to the data input specifications required by the display section. That is, display data 255 does not necessarily correspond to white. Therefore, it is necessary to define the standardization table based on the specifications of the display section 22 or the specifications required for display. Furthermore, though an evaluation value table with one hundred stages is defined here, a table with more detailed stages and a rougher table, for example, with about ten stages are also possible. Furthermore, in the example in FIG. 5, all the face evaluation values equal to or above 100 may be treated as 100.

By displaying the frame continuously or by stages according to the face evaluation value in this way, it is possible to smoothly display the frame, avoiding the conventional sudden display change between display and non-display of the frame.

Next, description will be made on the content of processing to be performed in the case of changing the frame indicating a face continuously or by stages according to the face evaluation value, by the image-taking apparatus 1 configured as described above.

Figure 6:
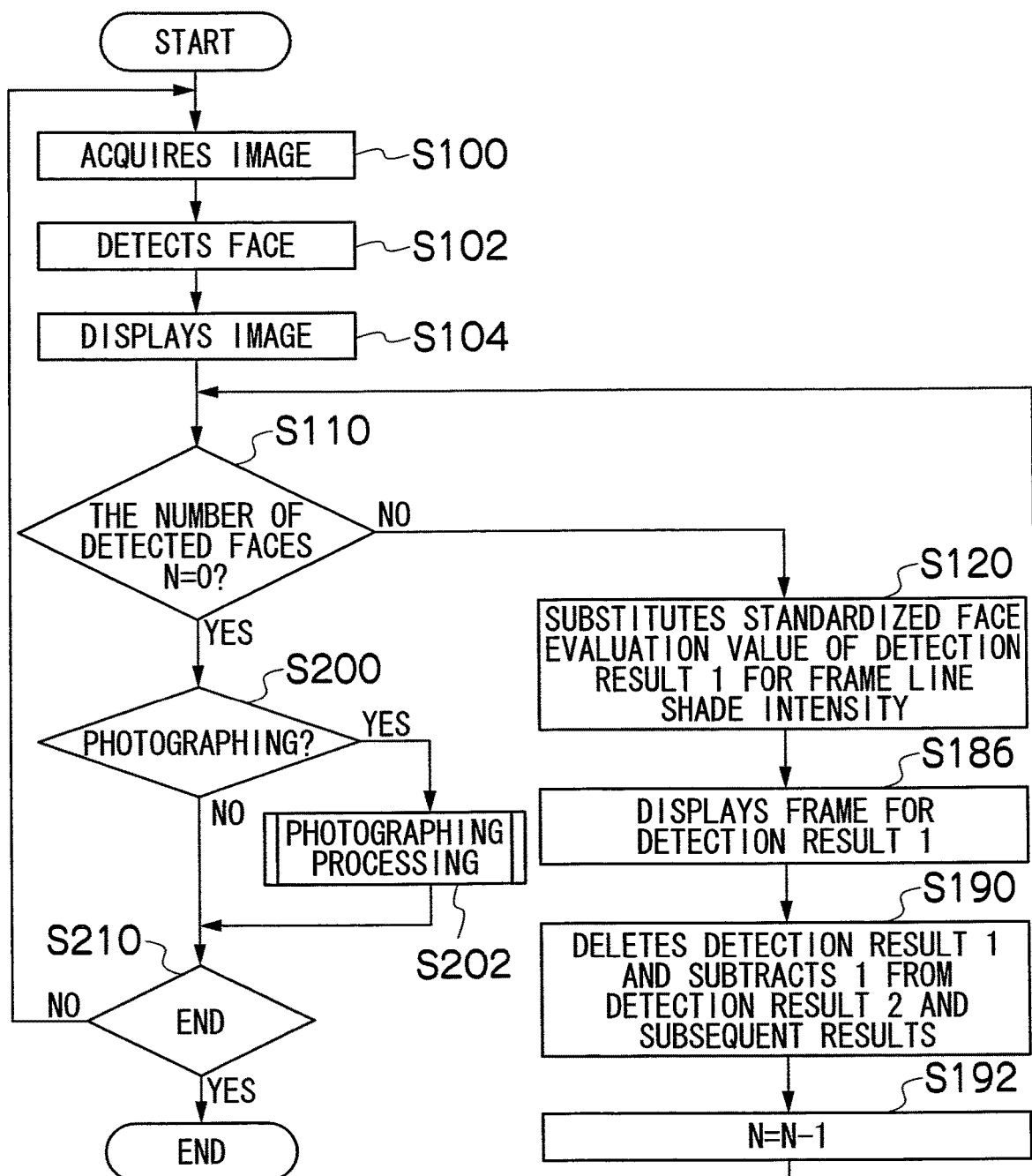
FIG. 6 is a flowchart showing a procedure for the CPU to display the frame continuously or by stages according to the face evaluation value.

FIG. 6 is a flowchart showing a procedure for the CPU 20 to display the frame continuously or by stages according to the face evaluation value.

Signal processing is performed for an image signal obtained by inputting an image from or taking an image with the image input section 10, at an input signal processing section to acquire the image signal as an image (step S100). Next, at the face detection section, particular targets of a subject included in the inputted image, that is, a face, eyes, pupils, a nose, a mouth and the like are detected from the inputted image, and the feature points and patterns of them are identified to detect the face of the subject (step S102). Next, the image inputted from the image input section 10 is displayed (step S104). Next, at step S110, if "the number N of detected faces=0" is not satisfied, then the flow proceeds to step S120. "If the number N of detected faces=0" is satisfied, then the flow proceeds to step S200.

At step S120, the CPU 20 first substitutes the standardized face evaluation value of a detection result 1 for the frame line shade intensity. Then, the flow proceeds to step S186, the frame for the detection result 1 is displayed on the display section 22 with a frame line for which the shade intensity has been set at step S120. Then, the detection result 1 is deleted at step S190, and 1 is subtracted from the numbers of a detection result 2 and subsequent detection results. In the example of the table in FIG. 3 of standardized face evaluation values and position information about the frame indicating a face obtained from the detection position and the parameter detection positions, the detection result 2 is moved up to the detection result 1, the detection result 3 is moved up to the detection result 2, and the detection result 1 is deleted. Then, the flow proceeds to step S190, and 1 is subtracted from the number of detected faces N. Then, the flow returns to step S110 and repeats the similar processing until the number of detected faces N becomes 0. As a result, the frame line can be displayed with a frame line shade intensity according to the face detection result, and an operator can know the detection result. Furthermore, it is possible to avoid sudden display change being made depending on whether a face has been detected or not, and natural display can be possible.

At step S200, it is determined whether or not to perform photographing. Usually, the determination is made based on whether a shutter button or a recording button (neither of them are shown) provided on the operation section 26 has been pushed or not. If photographing processing is to be performed, then the photographing processing is performed at step S202, and the flow proceeds to step S210. If the photographing processing is not to be performed, then the flow proceeds directly to step S210, and it is determined whether or not to end the processing. If the processing is not to be ended, the flow returns to step S100, and the similar processing is repeated.

Here, acquisition of an image (step S100), detection of a face (step S102) and display of the image (step S104) are performed in time sequence for convenience of description with reference to the flowchart. However, it is also possible to perform the display of the image (step S104) while performing the detection of a face (step S102), for example, in the case of such a configuration that the face detection section operates independently from the CPU 20, and it is rather desirable in order to shorten the entire processing. Not only for the parts described above but also for the parts described below, higher speed can be realized by performing parallel processing if possible.

Here, an image is displayed on the display section 22 first, and then a frame is displayed on the display section 22. However, it is also possible to first synthesize an image and a frame to be displayed and then send the synthesized result to the display section 22 to display it thereon, depending on the configuration of the apparatus.

Furthermore, it is not necessarily required to display an image. For example, in the case of an image-taking apparatus for monitoring intended to monitor whether the face of a person exists or not, it is sufficient to display only a face frame, without displaying an image. Because it is sufficient to display the image only when it is determined necessary to do so from the displayed frame. For example, the following is conceivable. When a face is detected, a frame is displayed. Then, if the detection continues for a predetermined period of time (for example, three seconds or more), then an image is displayed for the first time. This makes it possible to monitor not a monitoring picture screen on which a lot of targets are displayed and which requires alertness but only a necessary monitoring screen.

First Variation Example of the First Embodiment of Frame Display

Figure 7:
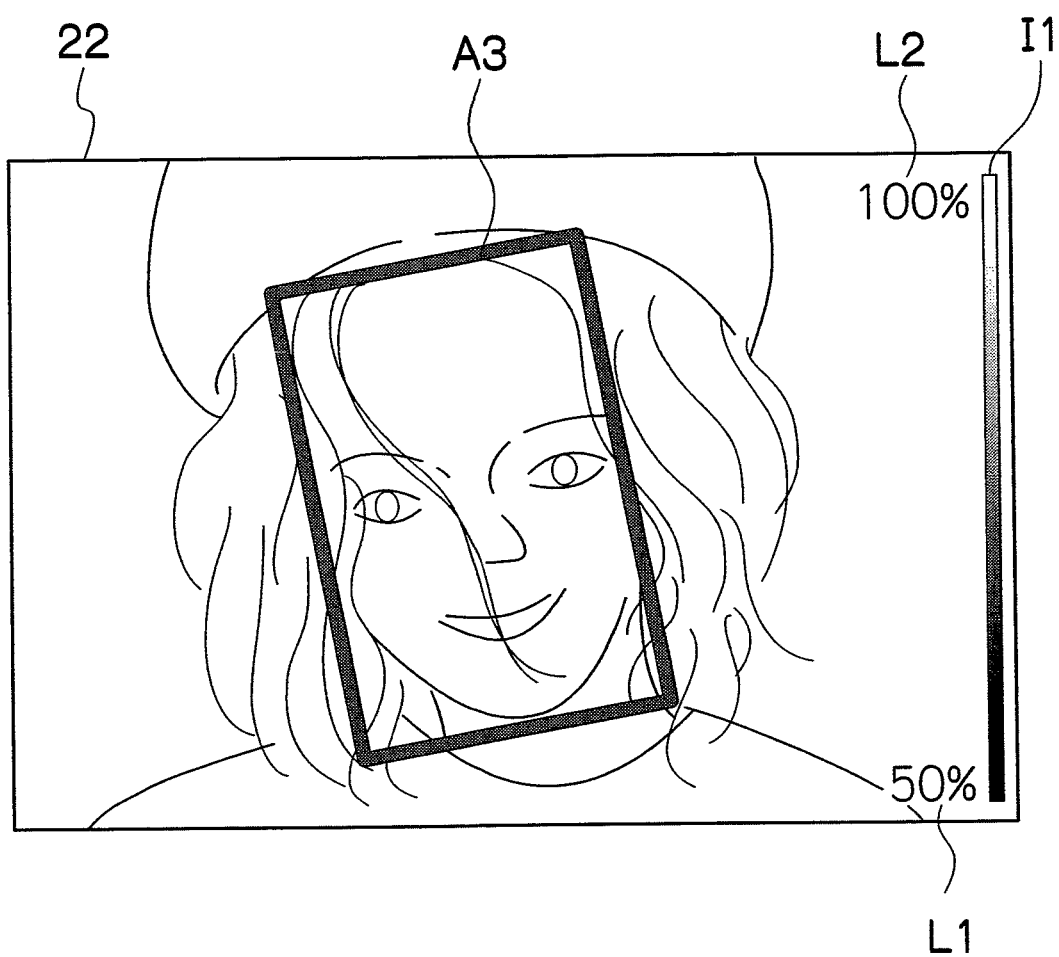
FIG. 7 shows an example where the frame is displayed continuously or by stages according to the face evaluation value, and an indicator is also displayed.

Next, FIG. 7 shows an example of the CPU 20 generating, from the standardized face evaluation value (for example, a face evaluation value standardized with the use of standardization 2 in FIG. 5) and the position of a frame indicating a face, outputted from the face detection section 30, a frame display indicating a face, displaying the frame on the display section 22 and displaying an indicator and the like indicating the correspondence between the frame display and the standardized face evaluation value.

In FIG. 7, as examples of the indicator and the like, an example of displaying an indicator I1 in gradation at the right end and showing a display of 50% (L1) at the lower right and a display of 100% (L2) at the upper right. An operator (or a user) can know an approximate value of the standardized face evaluation value by comparing the displayed frame indicating a face with the indicator and the like. That is, an approximate value of the face evaluation value can be known based on which shade intensity at which position of the indicator I1 displayed in gradation the shade intensity of the frame line indicating a face corresponds to.

In this embodiment, the frame indicating a face is displayed when the standardized face evaluation value is equal to or above a display determination value (in the example in FIG. 7, 50% or above). Thereby, it is possible to display only a frame indicating such a face that the face evaluation value is equal to or above a set display determination value, and avoid complicatedness of display. Furthermore, this display determination value may be selected from among values inputted in advance or may be inputted by the operator. It is possible to display a face with a lower face evaluation value or only a face with a high face evaluation value as the operator likes.

Figure 8:
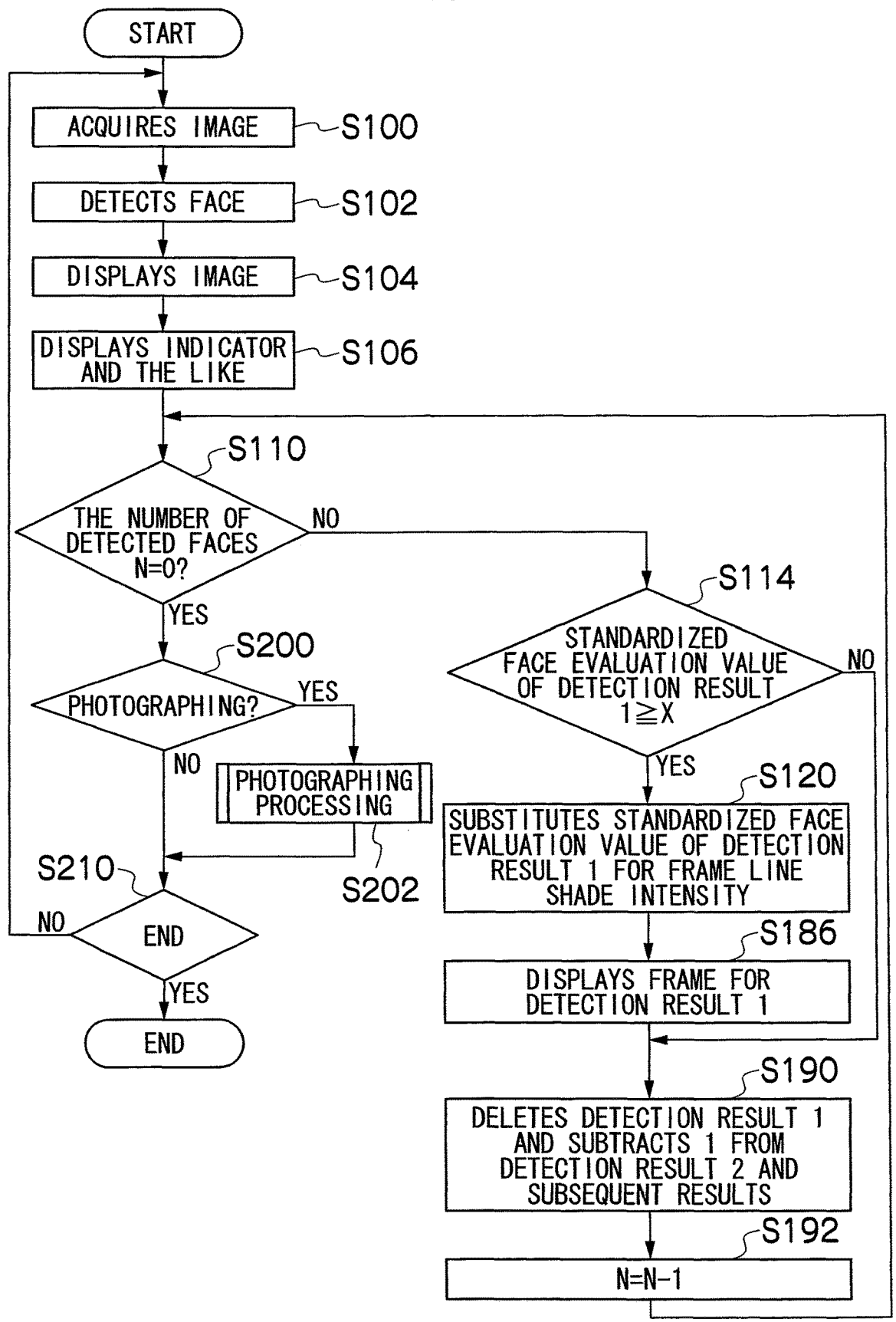
FIG. 8 is a flowchart showing a procedure for the CPU to display the frame continuously or by stages according to the face evaluation value and display an indicator.

FIG. 8 is a flowchart showing a procedure for the CPU 20 to display the frame continuously or by stages according to the face evaluation value and display an indicator.

Since this embodiment is a variation example of FIG. 6, only parts different from FIG. 6 will be described.

Acquisition of an image (step S100), detection of a face (step S102) and display of the image (step S104) are similar to those in FIG. 6. After the display of the image (step S104), an indicator and the like are displayed at step S106. The indicator and the like include the indicator I1 and the displays L1 and L2 of the numerical values of the indicator as shown in FIG. 7.

Next, if the number of detections is not 0 at the determination of the number of detected faces at step S110, then the flow proceeds to step S114, where it is determined whether or not the standardized face evaluation value of a detection result 1 is equal to or above a numerical value set in advance as a lower limit for display (here, X). Since a frame is to be displayed if the standardized face evaluation value of the detection result 1 is equal to or above X, the frame is displayed (steps S120 and S186). However, this is the same as in FIG. 6, and description thereof will be omitted. Then, the flow proceeds to step S190. On the other hand, if the standardized face evaluation value of the detection result 1 is below X, then a frame is not displayed, and the flow proceeds to step S190.

The subsequent steps (steps S190, S192, S200, S202 and S210) are similar to those in FIG. 6.

Thus, an operator can know the face evaluation value of the frame indicating a face in more detail by referring to the indicators. By setting the face evaluation value (display determination value) for displaying a frame, it is possible to avoid that a frame is displayed for a target with a low evaluation value which includes noise. By selecting the display determination value from among values set in advance or setting it, the determination value for display can be changed according to purposes. For example, in the case where a face is surely to be captured, such as a case of photographing a face in close-up, the display determination value can be set high.

Furthermore, by displaying a frame even when the face evaluation value of a subject is lower in comparison with the face evaluation value of a usually displayed subject, it is possible to avoid sudden change in the frame display and certainly confirm the reliability of display from the indicator.

Second Variation Example of the First Embodiment of Frame Display

Figure 9:
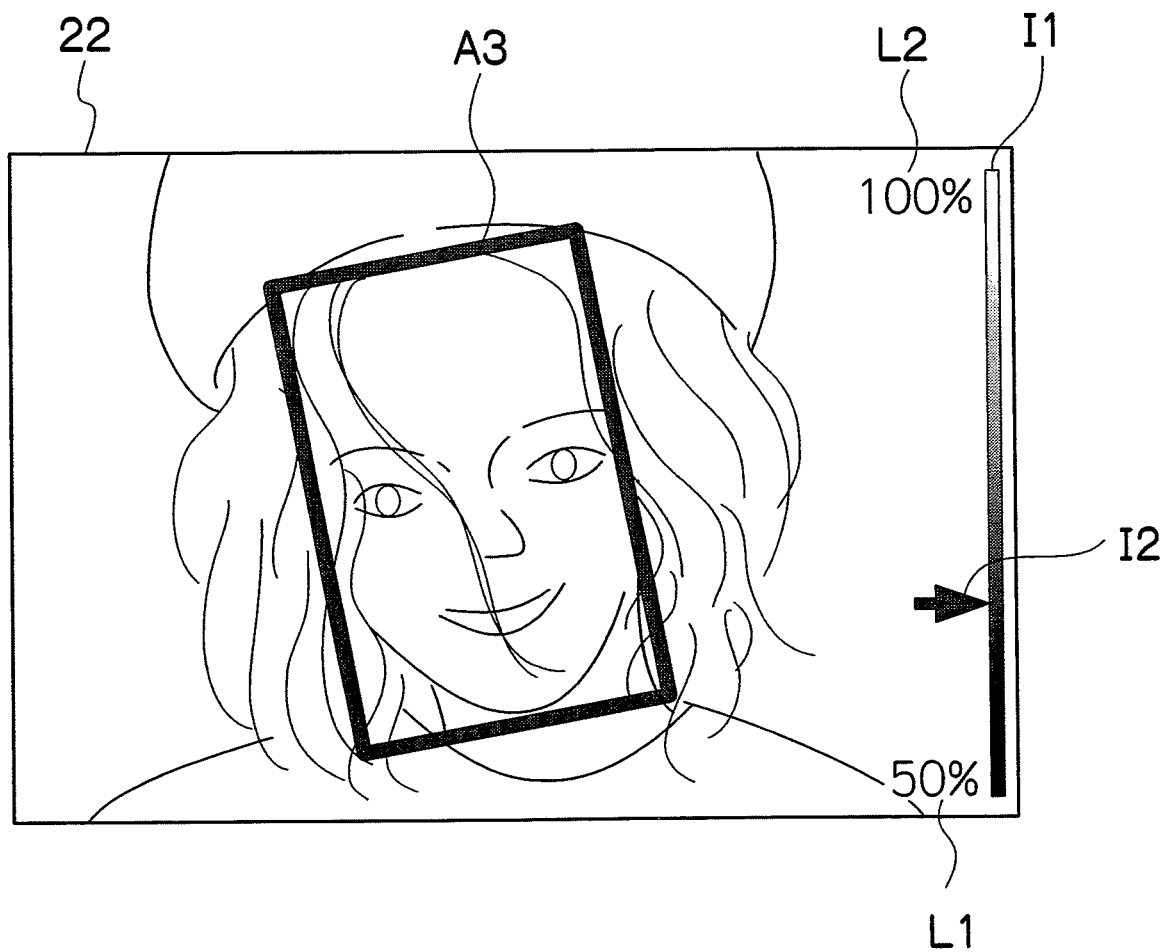
FIG. 9 shows an example where, when the frame is displayed continuously or by stages according to the face evaluation value and an indicator is also displayed, a display indicating the face evaluation value is shown on the indicator.

FIG. 9 shows an example of the CPU 20 generating a frame display indicating a face, from the standardized face evaluation value and the position of a frame indicating a face, outputted from the face detection section 30, displaying it on the display section 22, and, when displaying an indicator and the like indicating correspondence between the frame display and the standardized face evaluation value, showing a display indicating the face evaluation value on the indicator.

As the indicator and the like, an indicator I1 displayed in gradation is shown at the right end, and a display of 50% (L1) and a display of 100% (L2) are shown at the lower right and the upper right, respectively, similar to FIG. 7. Furthermore, an arrow is displayed to point at the face evaluation value of the frame indicating a face. An operator (or a user) can accurately know the value of the standardized face evaluation value by looking at the indicator and the like.

Figure 10:
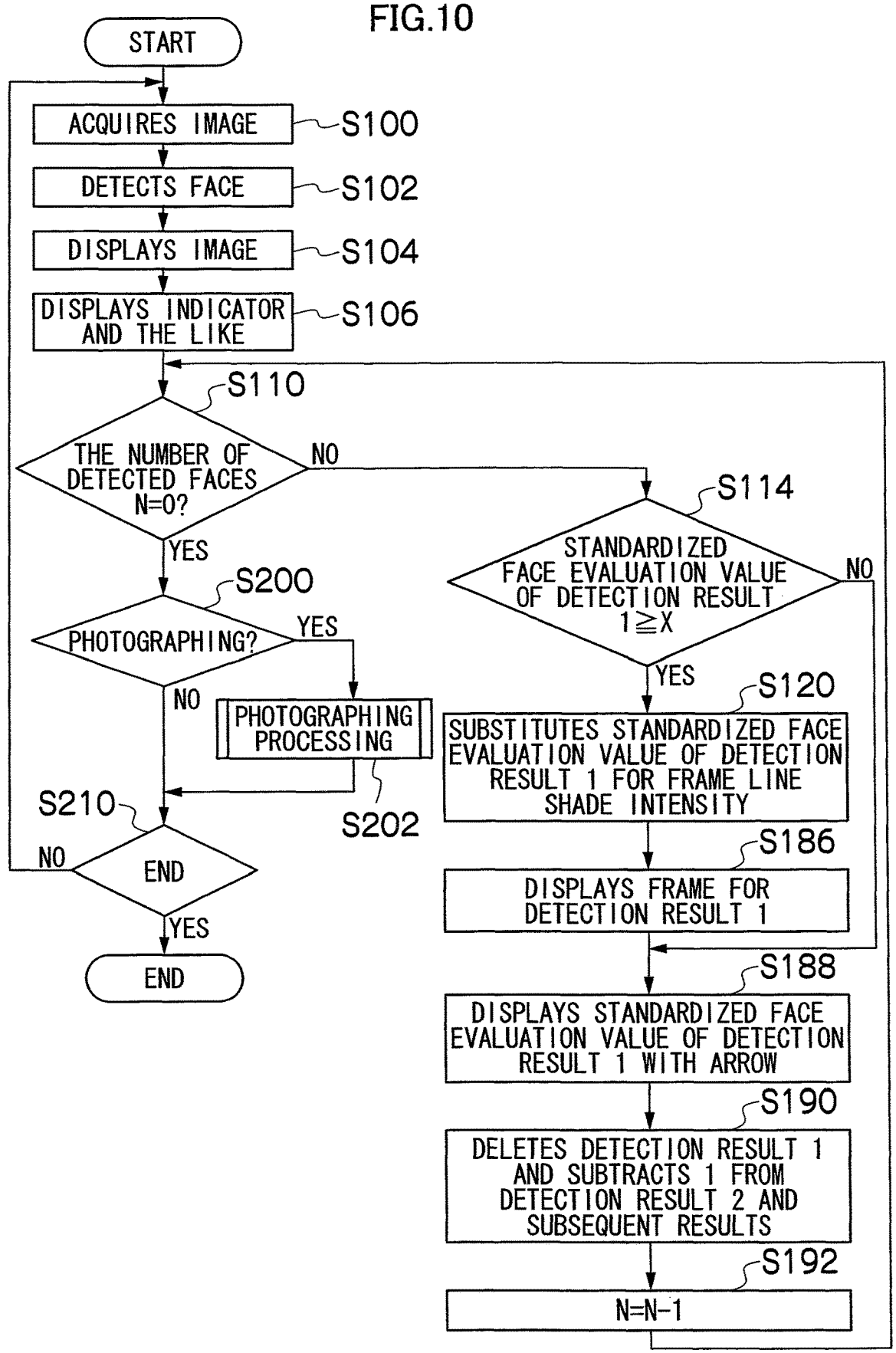
FIG. 10 is a flowchart showing a procedure for the CPU to, when displaying the frame continuously or by stages according to the face evaluation value and displaying an indicator, show a display indicating the face evaluation value on the indicator.

FIG. 10 is a flowchart showing a procedure for the CPU 20 to display a frame continuously or by stages according to the face evaluation value and display the face evaluation value on an indicator. Since this flowchart is a variation example of FIG. 8, only parts different from FIG. 8 will be described.

Acquisition of an image (step S100), detection of a face (step S102), display of the image (step S104), display of an indicator and the like (step S106), determination of the number of detected faces (step S110), determination on whether or not to perform photographing and processing performed in the case where photographing is to be performed (steps S200 and S202) and end determination processing (step S210) are similar to those in FIG. 8. Determination on whether or not to display a standardized face evaluation value of a detection result 1 (step S114) and the display of a frame line in the case where the face evaluation value is equal to or above a display determination value (steps S120 and S186) are also similar.

After the frame is displayed at step S186, the standardized face evaluation value of the detection result 1 is displayed on the indicator at step S188. The subsequent steps (steps S190 and S192) are similar to those in FIG. 8.

Thereby, the operator can know the face evaluation value of the frame indicating a face in more detail from the indicator. Therefore, it becomes easier to set a display determination value for displaying a frame. Furthermore, by displaying such a portion with a low face evaluation value as has not been conventionally displayed, as described above, it is possible to avoid blinking of the display of the frame indicating a face, and, by displaying the face evaluation value of the frame indicating a face on an indicator, it is possible to show the reliability of the displayed frame.

Third Variation Example of the First Embodiment of Frame Display

Figure 11A:
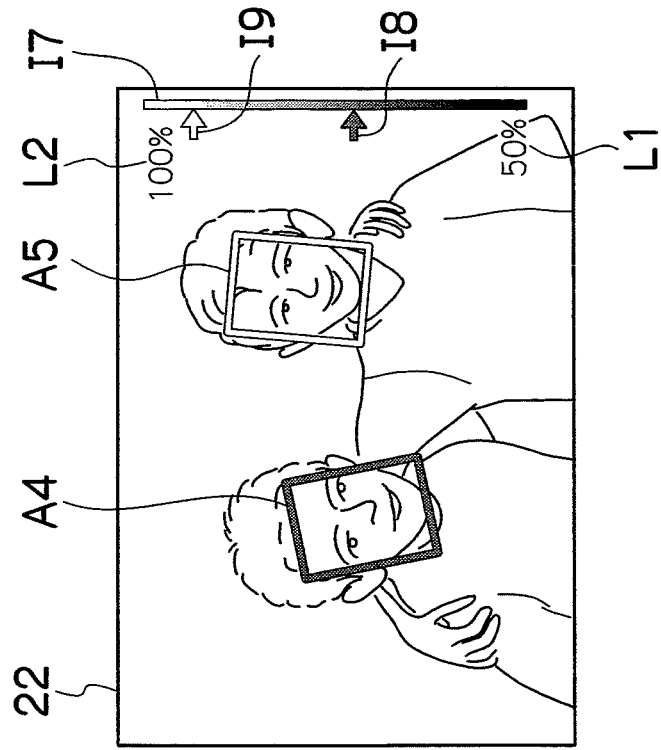
FIGS. 11A and 11B show an example where, when the frame is displayed continuously or by stages according to the face evaluation value and an indicator is also displayed, a display indicating the face evaluation value is shown on the indicator, and a different display color is used for each detection result.
Figure 11B:
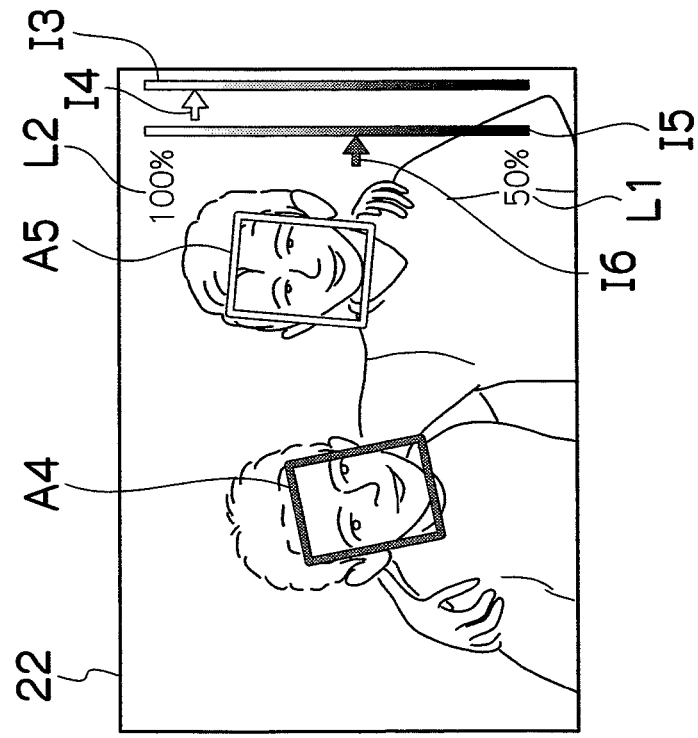

FIGS. 11A and 11B show an example of the CPU 20 generating a frame display indicating a face, from the standardized face evaluation value and the position of a frame indicating a face, outputted from the face detection section 30, displaying it on the display section 22, and, when displaying an indicator and the like indicating correspondence between the frame display and the standardized face evaluation value, showing a display indicating the face evaluation value on the indicator, with display colors changed according to detection results.

As the indicator and the like, an indicator displayed in gradation and displays of numerical values are shown at the right end, and pointers (arrows) pointing at the face evaluation value of the frame indicating a face is shown, similar to FIG. 9. Furthermore, in order to prevent the indicator and the like from being misread when multiple faces are detected, the same color is used for the indicator and the like and the frame indicating a face, for each detection result, and different colors are used for the display of different faces.

In FIG. 11A, a frame A4 indicating the face of a person on the left, an indicator IS and an arrow 16 are displayed in the same color, and a frame A5 indicating the face of a person on the right, an indicator 13 and an arrow 14 are displayed in the same color. The color of the numerical number displays L1 and L2 may be the same as that of any of the frames. If a color indicating the detection result 1 is set as the color, the display color is favorably prevented from frequently changing. The color of the numerical number displays L1 and L2 may be a color different from the colors of the frames. If a color used to display other information about the camera (for example, white) is used as the color, it is advantageously possible to share circuits or programs, though it is not shown here.

In FIG. 11B, an indicator 17 is used in common, and the frame A4 indicating the face of the person on the left and an arrow 18 are displayed in the same color, and the frame A5 indicating the face of the person on the right and an arrow 19 are displayed in the same color, in order to make it easy to distinguish. The colors of the numerical value displays L1 and L2 and the indicator 17 may be the same color as any of the frames. If a color indicating the detection result 1 is set as the color, the display color is favorably prevented from frequently changing. The color of the numerical number displays L1 and L2 may be a color different from the colors of the frames. If a color used to display other information about the camera (for example, white) is used as the color, it is advantageously possible to share circuits or programs, though it is not shown here.

Thus, an operator can know the standardized face evaluation value of each detected face in detail from the indicator.

Fourth Variation Example of the First Embodiment of Frame Display

FIGS. 12A, 12B and 12C show an example of the CPU 20 generating a frame display indicating a face from the standardized face evaluation value and the position of a frame indicating a face, outputted from the face detection section 30, and displaying it on the display section 22, with the hue of the frame changed according to the face evaluation value.

Here, the standardized face evaluation value is determined so that it is classified into any of the three stages of high (FIG. 12A), medium (FIG. 12B) and low (FIG. 12C). In the case of "high", a green frame A6 (FIG. 12A) is displayed. In the case of "medium" and "low", a yellow frame A7 (FIG. 12B) and a red frame A8 (FIG. 12C) are displayed, respectively. Thus, it is possible to know an approximate value of the standardized face evaluation value from the color of the frame line. Though the frame is displayed in the three stages here, it is possible to set no stage. In such a case, the hue gradually changes.

Figure 13:
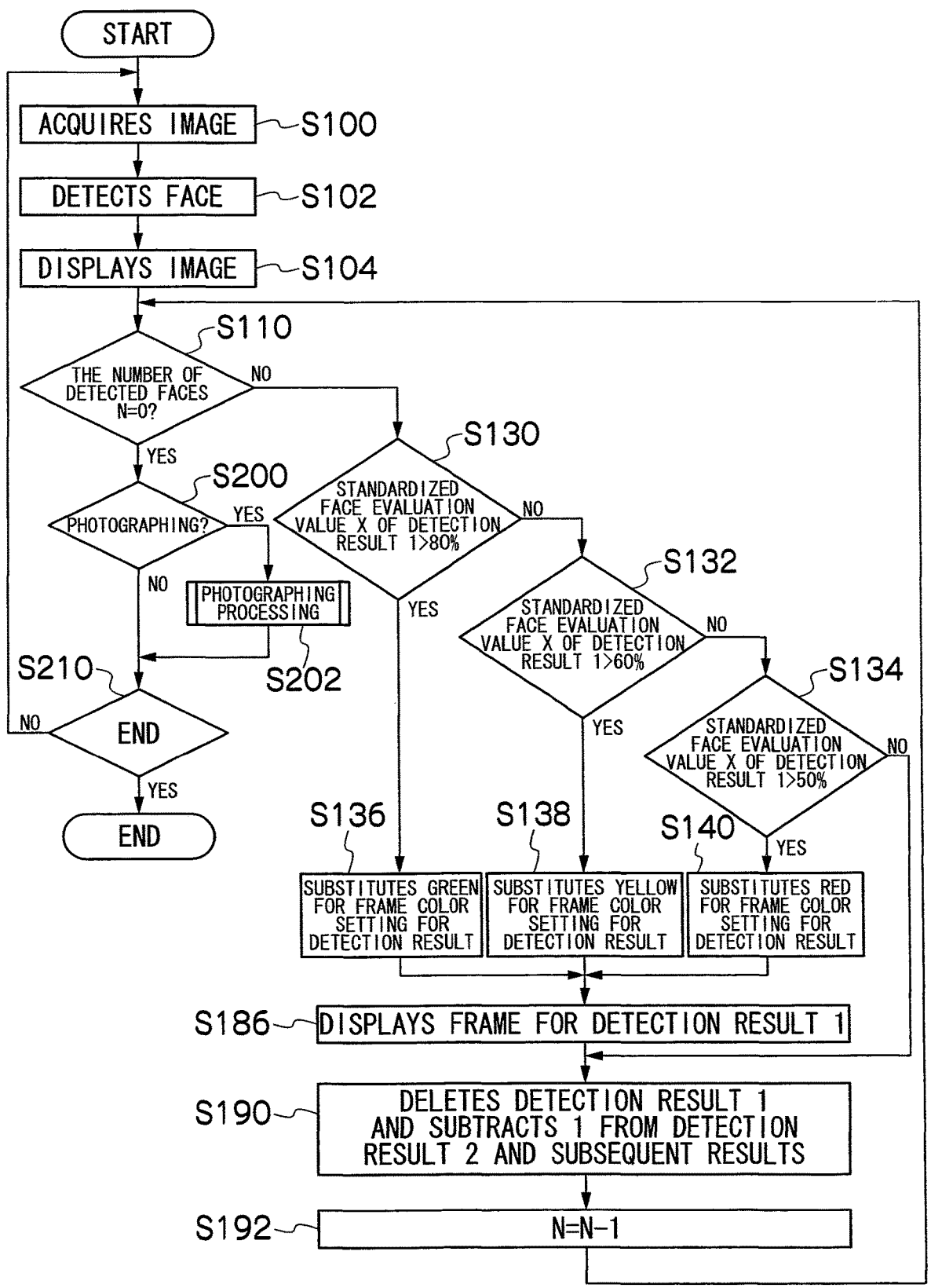
FIG. 13 is a flowchart of the CPU displaying the frame continuously or by stages according to the face evaluation value, with the hue of the frame changed according to the face evaluation value.

FIG. 13 is a flowchart of the CPU 20 generating a frame display indicating a face from the standardized face evaluation value and the position of a frame indicating a face, outputted from the face detection section 30, and displaying it on the display section 22, with the hue of the frame changed according to the face evaluation value. Since this flowchart is a variation example of FIG. 6, only parts different from FIG. 6 will be described.

Acquisition of an image (step S100), detection of a face (step S102), display of the image (step S104), determination of the number of detected faces (step S110), determination on whether or not to perform photographing and processing performed in the case where photographing is to be performed (steps S200 and S202), deletion of a displayed detection result and subtraction processing of the number of detections (steps S190 and S192) and end determination processing (step S210) are similar to those in FIG. 6.

If the number of detections is not 0 at the determination of the number of detected faces at step S110, then it is determined at step S130 whether or not the standardized face evaluation value x of the detection result 1 is "high" (x>80%). If the face evaluation value x is determined to be "high", then the flow proceeds to step S136, where green is set as the frame color for the detection result. If it is determined that the face evaluation value x is not "high", then the flow proceeds to step S132, where it is determined whether or not the face evaluation value x is "medium" (x>60%). Here, if it is determined that the face evaluation value is "medium", then the flow proceeds to step S138, where yellow is set as the frame color for the detection result. If it is determined that the face evaluation value x is not "medium", then the flow proceeds to step S134, where it is determined whether or not the face evaluation value x is "low" (x>50%). Here, if it is determined that the face evaluation value is "low", then the flow proceeds to step S140, where red is set as the frame color for the detection result. If it is determined that the face evaluation value x is not "low", that is, if the face evaluation value is too low to determine that the target is a face, a frame is not displayed, and the flow proceeds to step S190. In other cases, the frame indicating the face of the detection result 1 is displayed with the frame color set at step S136, S138 or S140. After that, similar processing is repeated the number of times corresponding to the number of detected faces.

Thus, an approximate value of the standardized face evaluation value can be known from the hue of the frame indicating a face. Furthermore, by displaying the frame indicating a face even in the case of a subject with a lower face evaluation value than a subject for which the frame has been displayed conventionally, it is possible to avoid blinking of the display of the frame. The reliability of the face evaluation value of a displayed face can be determined from the color.

Fifth Variation Example of the First Embodiment of Frame Display

Figure 14:
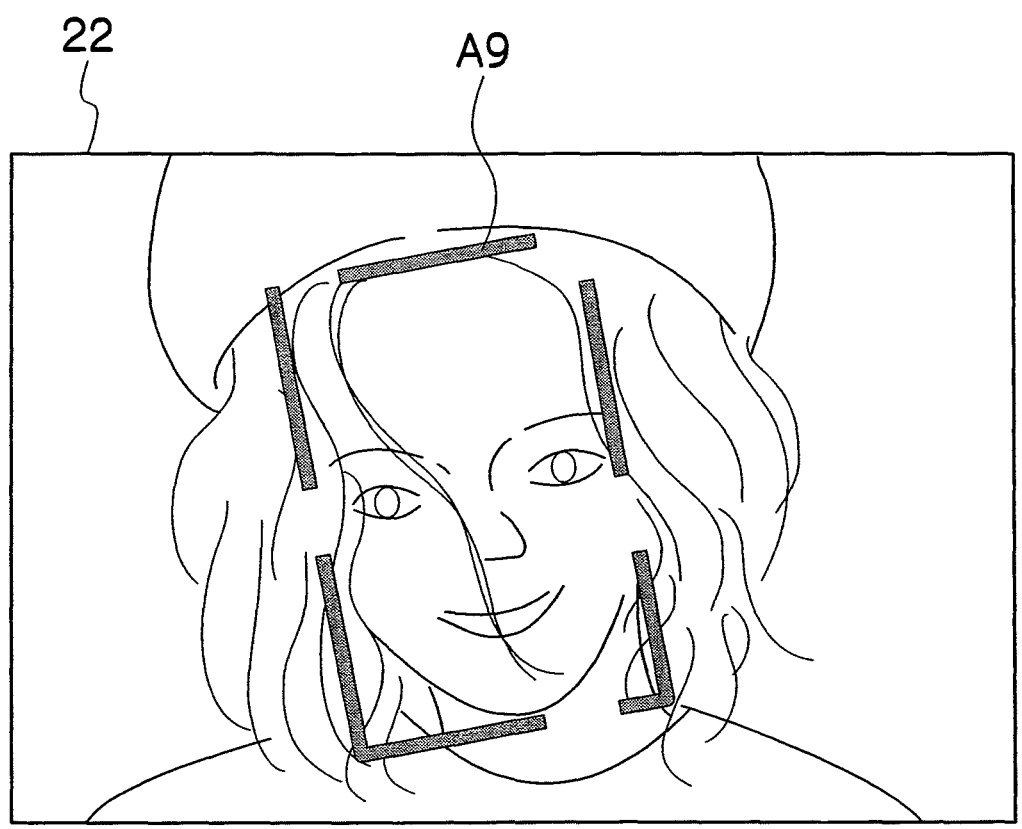
FIG. 14 shows an example where, when the frame is displayed continuously or by stages according to the face evaluation value, the line segment display rate of the line segments constituting the frame line of the frame is changed according to the face evaluation value.

FIG. 14 shows an example of the CPU 20 generating a frame display indicating a face from the standardized face evaluation value and the position of a frame indicating a face, outputted from the face detection section 30, and displaying it on the display section 22, with the line segment display rate of the line segments constituting the frame line of a frame changed according to the face evaluation value.

Here, the standardized face evaluation value is indicated as the line segment display rate of the line segments constituting the frame line. For example, when the whole frame line is displayed along the line segment directions of the frame line, that is, when the frame line is displayed by a solid line, the face evaluation value is 100%. When the displayed part of the frame line is 50% relative to the unit length, that is, when the frame line is displayed by a dashed line, and the rate of the line segments is 50%, the face evaluation value is 50%. As another display method, the rate of portions displayed as a frame line may be 50% when the whole frame line length is assumed as 100%. Thus, it is possible to instinctively know an approximate value of the standardized face evaluation value from the display of the frame line.

Figure 15:
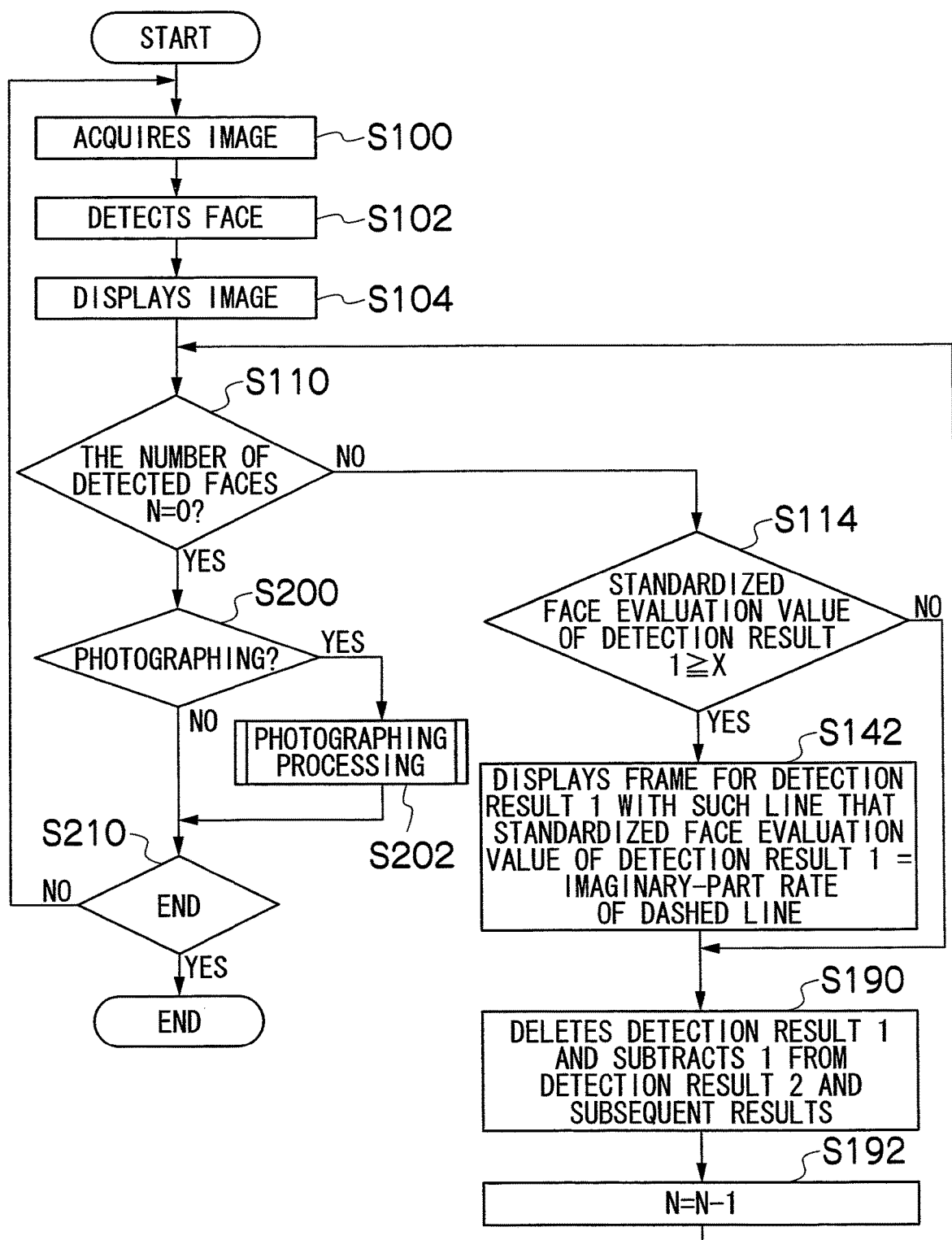
FIG. 15 is a flowchart of the CPU displaying the frame continuously or by stages according to the face evaluation value, with the line segment display rate of the frame changed according to the face evaluation value.

FIG. 15 is a flowchart of the CPU 20 generating a frame display indicating a face from the standardized face evaluation value and the position of a frame indicating a face, outputted from the face detection section 30, and displaying it on the display section 22, with the line segment display rate of the line segments constituting the frame line of a frame changed according to the face evaluation value. Since this flowchart is a variation example of FIG. 8, only parts different from FIG. 8 will be described.

Acquisition of an image (step S100), detection of a face (step S102), display of the image (step S104), determination of the number of detected faces (step S110), determination on whether or not to perform photographing and processing performed in the case where photographing is to be performed (steps S200 and S202), deletion of a displayed detection result and subtraction processing of the number of detections (steps S190 and S192) and end determination processing (step S210) are similar to those in FIG. 8. Though the step of display of an indicator and the like (step S106) shown in FIG. 8 is not shown in FIG. 15, it may be provided. As for the line segment display rate of the frame line, a value (a rate) indicating it is easy to detect. It is also effective to further indicate it by an indicator or the like.

If the number of detections is not 0 at the determination of the number of detected faces at step S110, then the flow proceeds to step S114, where it is determined whether or not the standardized face evaluation value of a detection result 1 is equal to or above a numerical value (here, X) set in advance as a lower limit for display. If the standardized face evaluation value of the detection result 1 is equal to or above X, a frame is to be displayed, and therefore, the flow proceeds to step S142. Here, a frame is displayed with a frame line having a line segment display rate according to the standardized face evaluation value of the detection result 1. After that, the flow proceeds to step S190. On the other hand, if the standardized face evaluation value of the detection result 1 is below X, the frame is not displayed, and the flow proceeds to step S190. Since the steps after step 190 are the same as those in FIG. 8, description thereof will be omitted.

Thus, an approximate value of the standardized face evaluation value can be known from the line segment display rate of the frame line of the frame indicating a face. Furthermore, by displaying the frame indicating a face even in the case of a subject with a lower face evaluation value than such a subject for which the frame has been conventionally displayed, it is possible to avoid blinking caused due to display and non-display of a frame. In addition to that it is possible to determine the reliability of the face evaluation value of a displayed face from the line segment display rate of the frame line, it is also possible to avoid annoying display of the frame even when the frame is continuously displayed because the displayed part is decreased in the case of a low face evaluation value.

Sixth Variation Example of the First Embodiment of Frame Display

Figure 16:
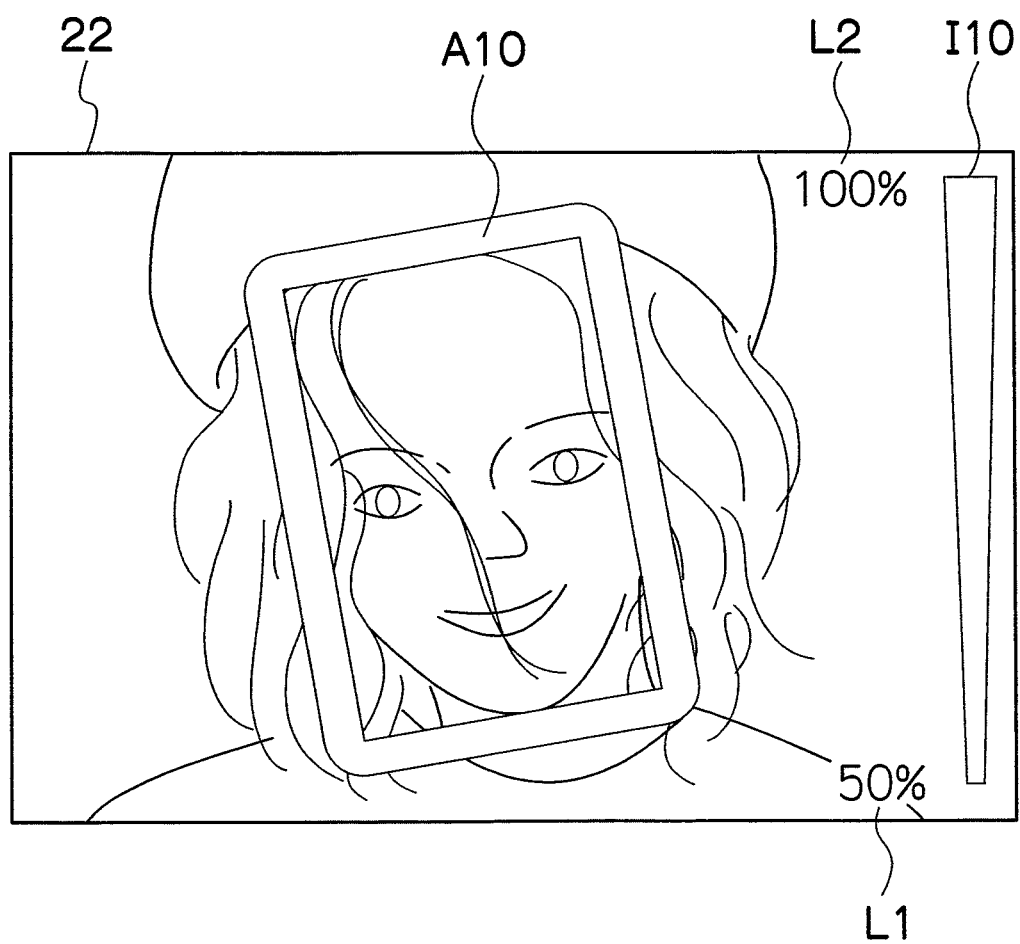
FIG. 16 shows an example where, when the frame is displayed continuously or by stages according to the face evaluation value, the frame line width of the frame is changed according to the face evaluation value.

FIG. 16 shows an example of the CPU 20 generating a frame display indicating a face from the standardized face evaluation value and the position of a frame indicating a face, outputted from the face detection section 30, and displaying it on the display section 22, with the width of the line segments constituting the frame line of the frame changed according to the face evaluation value.

Here, the standardized face evaluation value is indicated as the width of a frame line. When the face evaluation value is high, the frame line is displayed thick, and when the face evaluation value is low, the frame line is displayed thin. As the method for thickening the frame line, there are a method of determining the position to display the frame line and then increasing the width with the position as the center, a method of increasing the width only inward from the frame line and a method of increasing the width only outward from the frame line. In general, the method of increasing the width with the position of the frame line as the center is often a function provided for the CPU 20 in advance, and it is advantageous in that the program is simplified. The method of increasing the width only inward from the frame line is advantageous in that, when there are multiple faces positioned close to one another, interference with the display of the other frames can be avoided. The method of increasing the width only outward from the frame line is advantageous in that confirmation of the face displayed within the frame is not interfered with.

When the face evaluation value is indicated by the width of a frame line, it is possible to determine whether or not the face evaluation value is large or small from an approximate width, that is, from whether the width is thick or thin. However, if it is desired to display the face evaluation value more accurately, it is recommended to display an indicator. An indicator I10 is displayed at the right end of FIG. 16 in which the top end indicates the upper limit of the line width of a frame line to be displayed and the bottom end indicates the lower limit of the line width. Values for associating the line width and the face evaluation value may be displayed on the indicator. Here, there are displayed a value L2 indicating the upper limit of the line width at the top end and a value L1 indicating the lower limit of the line width at the bottom end. Of course, intermediate values may be displayed, or a scale may be provided on the indicator I10. The face evaluation value pointed at by an arrow may be displayed on the indicator I10.

Thus, it is possible to instinctively know an approximate value of the standardized face evaluation value from the display of the width of a frame line. It is not necessarily the whole line that is to be displayed with a changed width. For example, a part where the width of a line segment is changed and a part where the width is not changed may alternately appear at predetermined intervals. It is possible to prevent the frame line from being thin and difficult to visually confirm.

Figure 17:
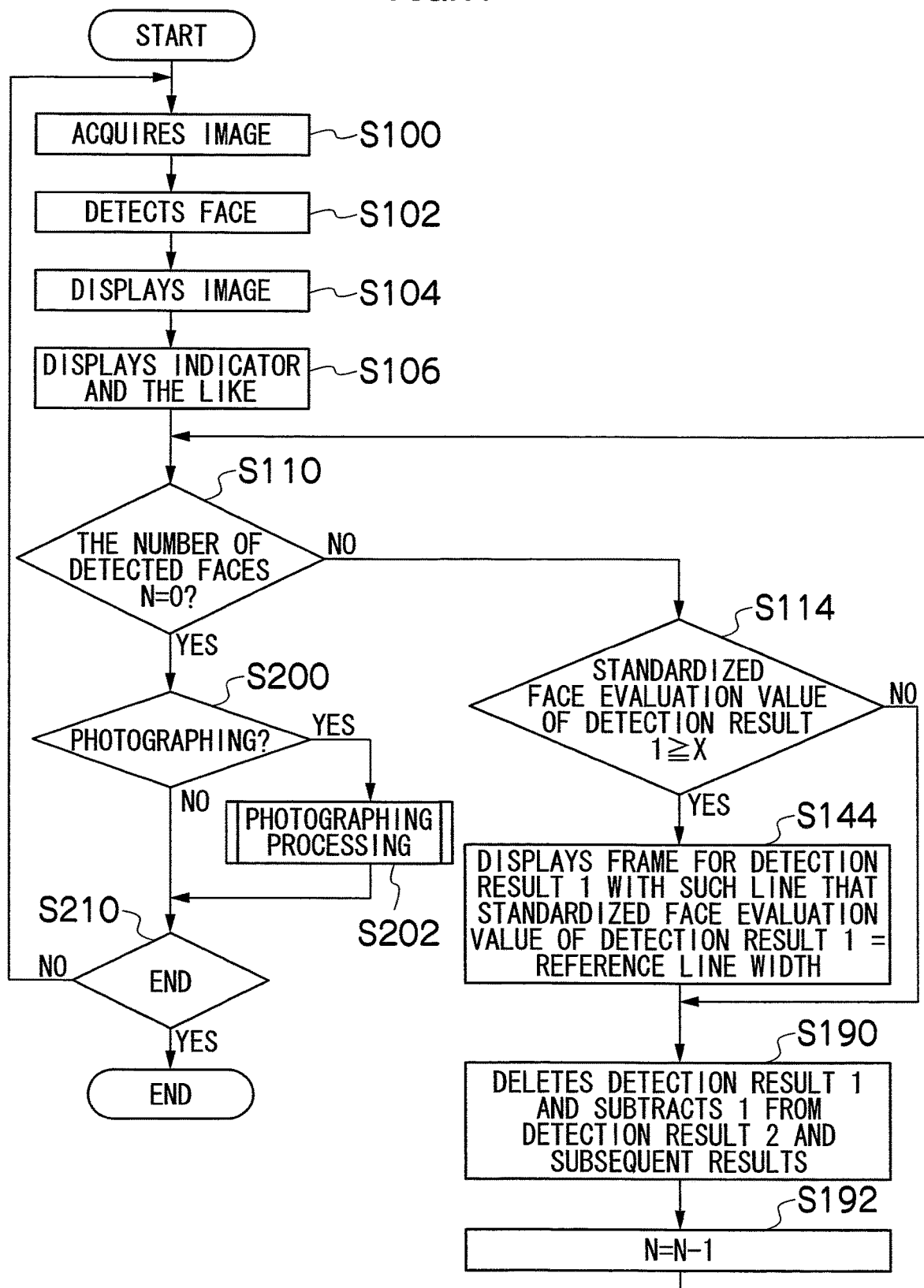
FIG. 17 is a flowchart of the CPU displaying the frame continuously or by stages according to the face evaluation value, with the frame line width of the frame changed according to the face evaluation value.

FIG. 17 is a flowchart of the CPU 20 generating a frame display indicating a face from the standardized face evaluation value and the position of a frame indicating a face, outputted from the face detection section 30, and displaying it on the display section 22, with the frame line width of the frame changed according to the face evaluation value. Since this flowchart is a variation example of FIG. 8, only parts different from FIG. 8 will be described.

Acquisition of an image (step S100), detection of a face (step S102), display of the image (step S104), display of an indicator and the like (step S106), determination of the number of detected faces (step S110), determination on whether or not to perform photographing and processing performed in the case where photographing is to be performed (steps S200 and S202), deletion of a displayed detection result and subtraction processing of the number of detections (steps S190 and S192) and end determination processing (step S210) are similar to those in FIG. 8. It does not matter whether or not the step of display of an indicator and the like (step S106) exists.

If the number of detections is not 0 at the determination of the number of detected faces at step S110, then the flow proceeds to step S114, where it is determined whether or not the standardized face evaluation value of a detection result 1 is equal to or above a numerical value (here, X) set in advance as a lower limit for display. If the standardized face evaluation value of the detection result 1 is equal to or above X, a frame is to be displayed, and therefore, the flow proceeds to step S144. Here, a frame is displayed with a frame line having a line width according to the standardized face evaluation value of the detection result 1. For example, a line with a 10-dot width is displayed in the case of a face evaluation value of 100%, and a line with a 5-dot width is displayed in the case of a face evaluation value of 50%. After that, the flow proceeds to step S190. On the other hand, if the standardized face evaluation value of the detection result 1 is below X, a frame is not displayed, and the flow proceeds to step S190. Since the steps after step S190 are the same as those in FIG. 8, description thereof will be omitted.

Thus, an approximate value of the standardized face evaluation value can be known from the frame line width of the frame indicating a face. Furthermore, it is possible to continuously display the frame, avoiding blinking caused due to the conventional operation of switching between display and non-display of a frame. In addition to that it is possible to determine the face evaluation value of a displayed face from the frame line width, it is also possible to know it in more detail if an indicator is displayed.

Because a displayed part decreases in the case of a low face evaluation value, it is possible to avoid annoying display of the frame even when the frame is continuously displayed.

Seventh Variation Example of the First Embodiment of Frame Display

Figure 18B:
FIGS. 18A, 18B and 18C show an example where, when the frame is displayed continuously or by stages according to the face evaluation value, the temporal display rate of the frame line is changed according to the face evaluation value.
Figure 18A:
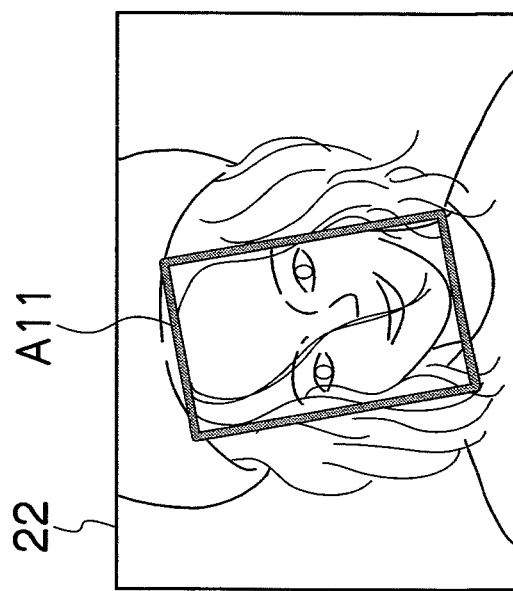
Figure 18C:
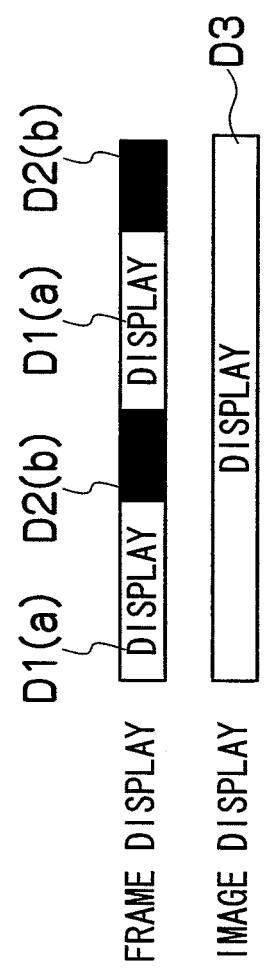

FIGS. 18A, 18B and 18C show an example of the CPU 20 generating a frame display indicating a face from the standardized face evaluation value and the position of a frame indicating a face, outputted from the face detection section 30, and displaying it on the display section 22, with the temporal display rate of the frame line changed according to the face evaluation value. Here, the standardized face evaluation value is indicated as the temporal display rate of a frame line. If the face evaluation value is 67%, the frame is displayed so that the time for which the frame is displayed is 67% (D1 and 18A) relative to a certain unit time and the time for which the frame is not displayed is 33% (D2 and 18B). If the unit time is short, a new blinking problem occurs. Therefore, it is desirable that the unit time is long to some extent. Naturally, the image is continuously displayed (D3).

Figure 19:
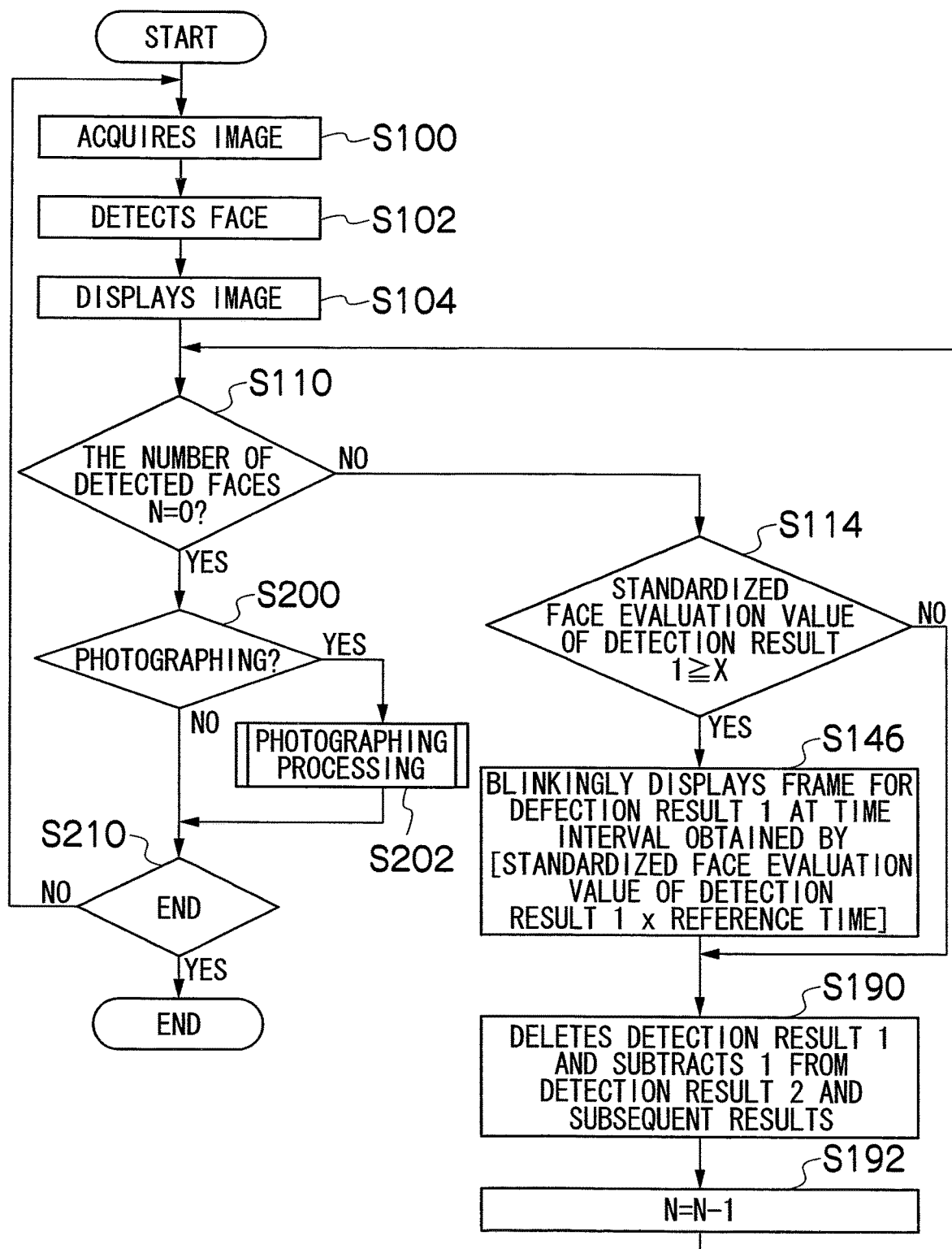
FIG. 19 is a flowchart of the CPU displaying the frame continuously or by stages according to the face evaluation value, with the temporal display rate of the frame line changed according to the face evaluation value.

FIG. 19 is a flowchart of the CPU 20 generating a frame display indicating a face from the standardized face evaluation value and the position of a frame indicating a face, outputted from the face detection section 30, and displaying it on the display section 22, with the temporal display rate of the frame line of the frame changed according to the face evaluation value. Since this flowchart is a variation example of FIG. 8, only parts different from FIG. 8 will be described.

Acquisition of an image (step S100), detection of a face (step S102), display of the image (step S104), determination of the number of detected faces (step S110), determination on whether or not to perform photographing and processing performed in the case where photographing is to be performed (steps S200 and S202), deletion of a displayed detection result and subtraction processing of the number of detections (steps S190 and S192) and end determination processing (step S210) are similar to those in FIG. 8. Though the step of display of an indicator and the like (step S106) shown in FIG. 8 is not shown in FIG. 19, it may be provided.

If the number of detections is not 0 at the determination of the number of detected faces at step S110, then the flow proceeds to step S114, where it is determined whether or not the standardized face evaluation value of a detection result 1 is equal to or above a numerical value set in advance as a lower limit for display (here, X). If the standardized face evaluation value of the detection result 1 is equal to or above X, a frame is to be displayed, and the flow proceeds to step S146. Here, the frame for the detection result 1 is blinkingly displayed at a time interval obtained by multiplying a reference time set in advance by the standardized face evaluation value of the detection result 1. For example, if the standardized face evaluation value is 100%, the frame is continuously displayed. If the standardized face evaluation value is 50%, the frame is displayed for 0.5 seconds and is not displayed for the remaining 0.5 seconds, in the case where the reference time is 1 second. Here, the description is made for step S146. However, actually, the step S146 means that a routine is continuously running.

After that, the flow proceeds to step S190. On the other hand, if the standardized face evaluation value of the detection result 1 is below X, the frame is not displayed, and the flow proceeds to step S190. Since the steps after step S190 are the same as those in FIG. 8, description thereof will be omitted.

Thus, the conventional display method using two kinds of display statuses of display and non-display of the frame is not performed, but the frame is continuously blinking, and an approximate value of the standardized face evaluation value can be known from the rate of time for which the frame is displayed.

Eighth Variation Example of the First Embodiment of Frame Display

Figure 20:
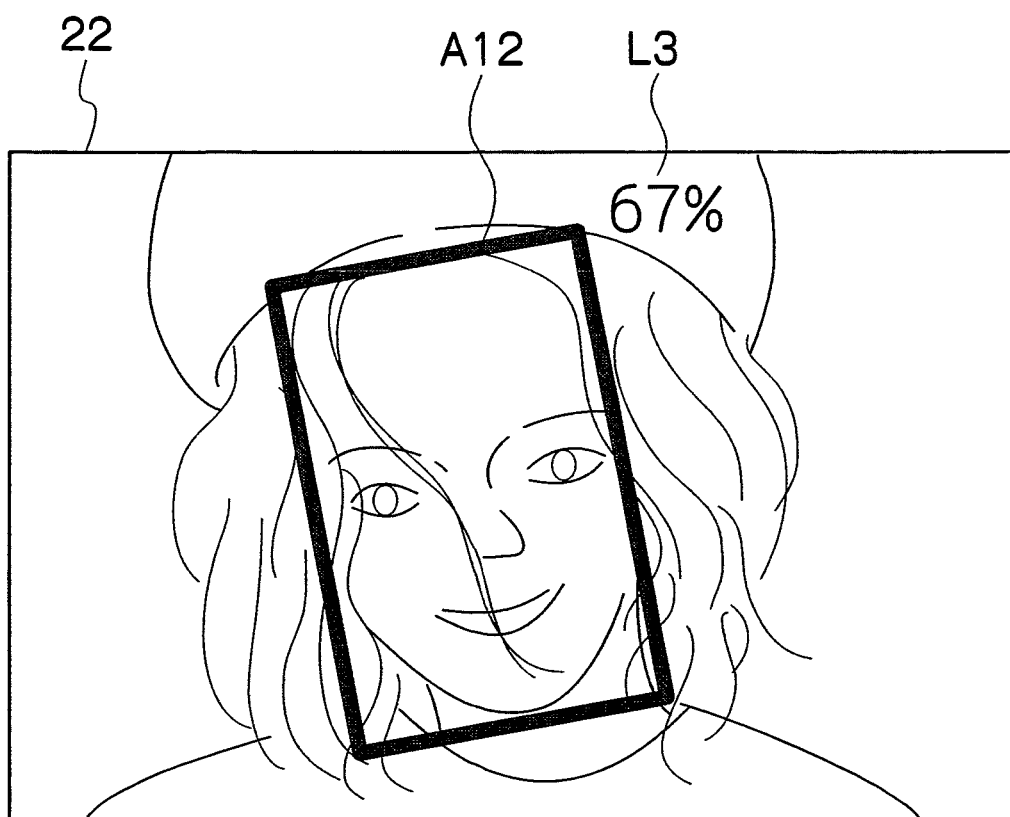
FIG. 20 shows an example where, when the frame is displayed continuously or by stages according to the face evaluation value, a standardized face evaluation value is displayed as a numerical value together with the frame line.

FIG. 20 shows an example of the CPU 20 generating a frame display indicating a face from the standardized face evaluation value and the position of a frame indicating a face, outputted from the face detection section 30, and displaying it on the display section 22, with the standardized face evaluation value displayed as a numerical value (L3) together with the frame line. Here, the standardized face evaluation value is displayed with 100% as a reference. However, the reference value for standardization can be selected according to necessities. For example, the standardized face evaluation value may be indicated with 10 as a reference. It may not be indicated by %. Furthermore, the standardized face evaluation value may be combined with any other frame line display or may be combined with an indicator. It is advantageous that the standardized face evaluation value can be detected more specifically.

Figure 21:
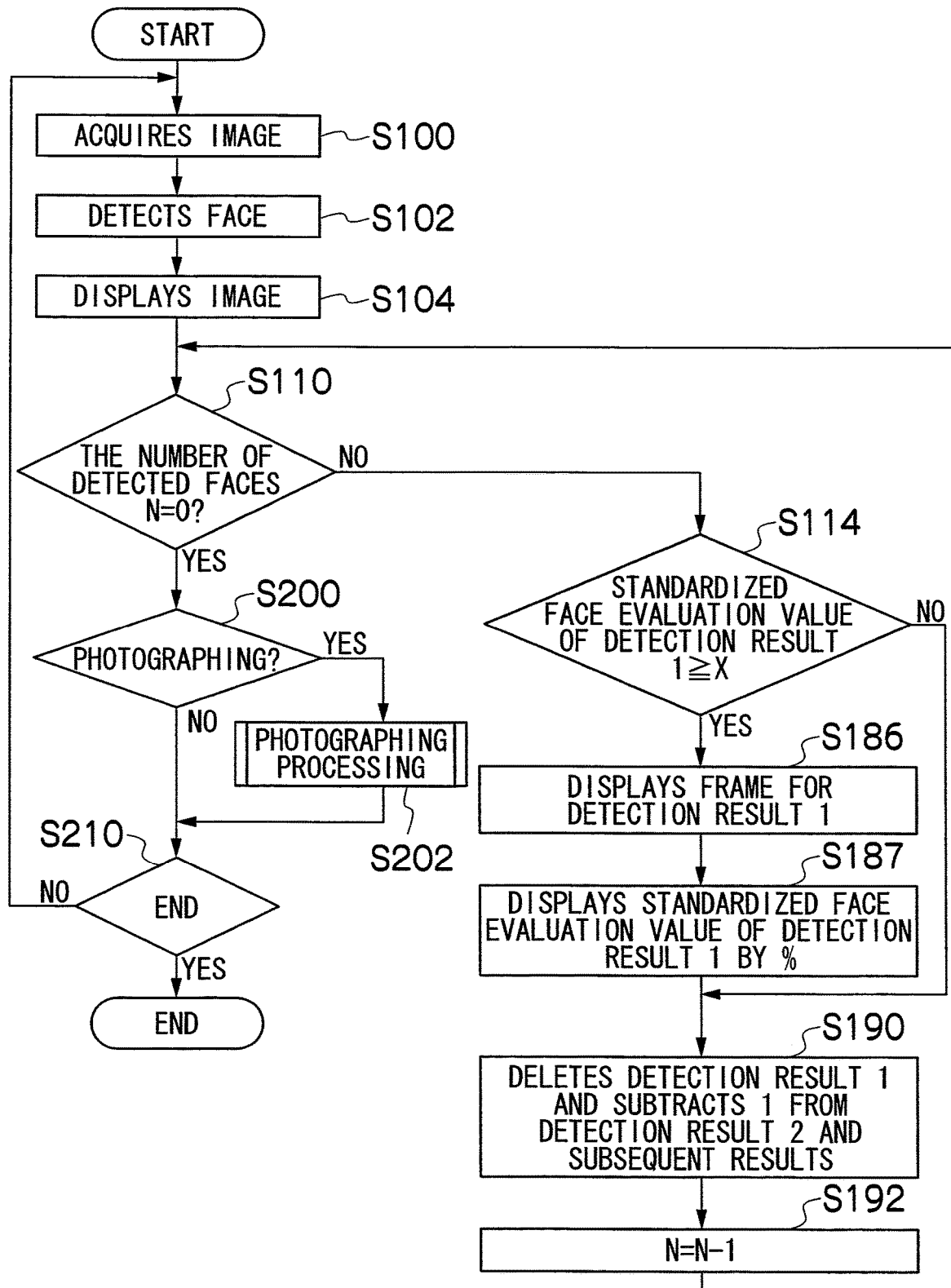
FIG. 21 is a flowchart of the CPU displaying the frame continuously or by stages according to the face evaluation value, with a standardized face evaluation value displayed as a numerical value together with the frame line.

FIG. 21 is a flowchart of the CPU 20 generating a frame display indicating a face from the standardized face evaluation value and the position of a frame indicating a face, outputted from the face detection section 30, and displaying it on the display section 22, with the standardized face evaluation value displayed as a numerical value (L3) together with the frame line. Since this flowchart is a variation example of FIG. 8, only parts different from FIG. 8 will be described.

Acquisition of an image (step S100), detection of a face (step S102), display of the image (step S104), determination of the number of detected faces (step S110), determination on whether or not to perform photographing and processing performed in the case where photographing is to be performed (steps S200 and S202), deletion of a displayed detection result and subtraction processing of the number of detections (steps S190 and S192) and end determination processing (step S210) are similar to those in FIG. 8. Though the step of display of an indicator and the like (step S106) shown in FIG. 8 is not shown in FIG. 21, it may be provided.

If the number of detections is not 0 at the determination of the number of detected faces at step S110, then the flow proceeds to step S114, where it is determined whether or not the standardized face evaluation value of a detection result 1 is equal to or above a numerical value (here, X) set in advance as a lower limit for display. If the standardized face evaluation value of the detection result 1 is equal to or above X, a frame is to be displayed, and therefore, the flow proceeds to step S186. Here, a frame indicating a face is displayed, and after that, the standardized face evaluation value of the detection result 1 is displayed at step S187. Though the standardized face evaluation value is displayed as a numerical value here, it may be displayed in a different manner. For example, it is possible to indicate the standardized face evaluation value by a shape such as a pie chart or by the size of an indicator in a particular shape.

After that, the flow proceeds to step S190. On the other hand, if the standardized face evaluation value of the detection result 1 is below X, a frame is not displayed, and the flow proceeds to step S190. Since the steps after step S190 are the same as those in FIG. 8, description thereof will be omitted.

Thus, by displaying the frame indicating a face if a face evaluation value can be calculated and it is equal to or above a certain value, it is possible to avoid the conventional display method using two kinds of display statuses of display and non-display of the frame but perform continuous display of the frame. Furthermore, by displaying the evaluation value, a standardized face evaluation value can be known.

These variation examples can be embodied in combination with one another. By combining multiple examples, smoother display can be realized. For example, it is possible to change the frame line width while changing the frame line shade intensity. Of course, the combination is not limited to the combination of these two examples, and combination of more than two examples is also possible. At step S186, the color or the shade intensity of the frame may be changed according to the standardized face evaluation value, and it is also possible to, when a frame is to be displayed, display a constant frame irrespective of the face evaluation value.

Next, description will be made on an example in which the display of the frame indicating a face is caused to change with the lapse of time if the standardized face evaluation value changes from a value equal to or above the display determination value to a value below the display determination value or if the standardized face evaluation value changes from a value below the display determination value to a value equal to or above the display determination value, at the time of displaying the frame indicating a face on the display section 22 of the image-taking apparatus 1.

Second Embodiment of Frame Display

Figure 22:
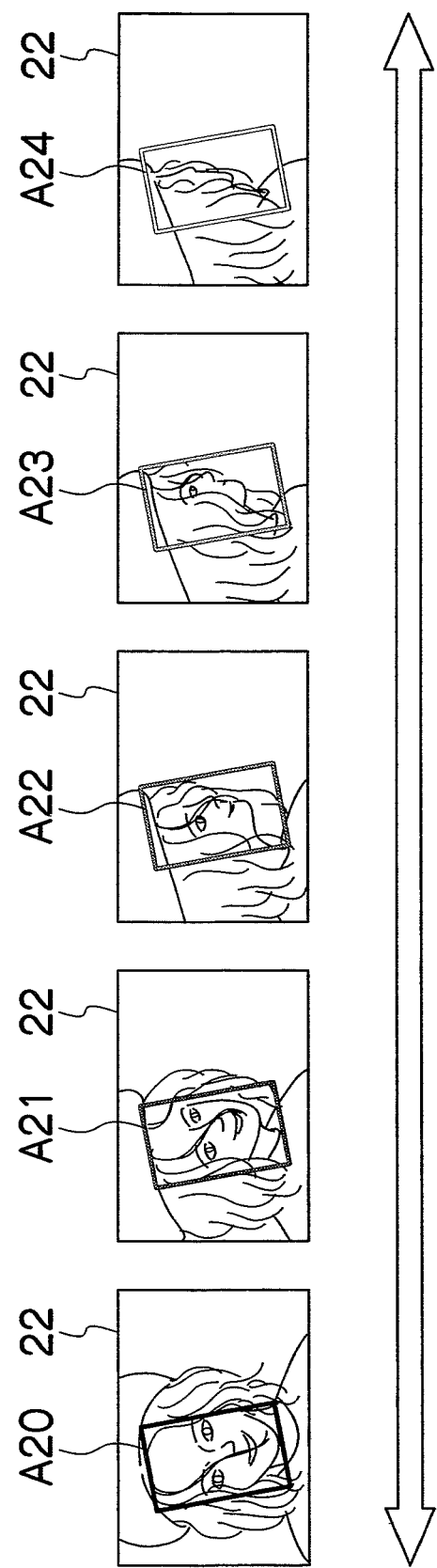
FIG. 22 shows an example where, when the face evaluation value becomes equal to or above the display determination value of the frame indicating a face or below the value, the frame is changed with the lapse of time.

FIG. 22 shows an example of the CPU 20 generating a frame display indicating a face from the standardized face evaluation value and the position of a frame indicating a face, outputted from the face detection section 30, and causing it to change with the lapse of time when displaying it on the display section 22. In this example, the standardized face evaluation value is indicated by the shade intensity of the frame line. That is, when the standardized face evaluation value is small, the frame line is displayed with a low shade intensity, and when the standardized face evaluation value is large, the frame line is displayed with a high shade intensity.

For example, when the frame line display determination value is X %, and the face evaluation value changes from a value equal to or above the display determination value to a value below the display determination value, the display of the frame is not stopped instantaneously, but the frame line gradually disappears. In FIG. 22, the figure at the left end indicates that the standardized face evaluation value exceeds the display determination value, and in this case, the frame line indicating the face is displayed, for example, with a shade intensity based on the evaluation value (A20). In this case, if, when the standardized face evaluation value equal to or above the display determination value and the frame indicating a face is displayed, the face evaluation value changes and becomes below the display determination value, and the frame line indicating a face is hidden instantaneously, then the frame line is displayed again when the standardized face evaluation value exceeds the display determination value again, and the display blinks. Therefore, by causing the display to disappear with the lapse of time so that it transitions from A21 to A24, it is possible to avoid sudden change in the display of the frame indicating a face. When the frame line display determination value is X %, and the face evaluation value changes from a value below the display determination value to a value equal to or above the display determination value, the frame is not displayed instantaneously, but the frame line gradually appears. To make description with reference to FIG. 22, the figure at the right end indicates that the standardized face evaluation value is below the display determination value, and the frame indicating a face is not displayed in the figure (A24). In this case, if, when the standardized face evaluation value exceeds the display determination value, the frame line indicating a face is displayed instantaneously, the frame line is hidden again when the standardized face evaluation value is below the display determination value again, and the display blinks. Therefore, by causing the display to appear with the lapse of time so that it transitions from A24 to A20, it is possible to avoid sudden change in the display of the frame indicating a face. That is, even if the face evaluation value changes from a value equal to or above the display determination value to a value below the display determination value, the frame indicating a face does not suddenly disappear but gradually disappears. Such display makes it possible not only to avoid sudden display change but also to make only slight display change even when the face evaluation value transitions around the display determination value, and thereby smooth display can be realized.

Thus, by causing the frame to appear or disappear continuously or by stages with the lapse of time when change from non-display to display of the frame is determined or when change from display to non-display is determined, it is possible to smoothly display the frame, avoiding the conventional sudden display change between display and non-display of the frame.

Next, description will be made on an example in which the display of the frame indicating a face is caused to change with the lapse of time if the standardized face evaluation value changes from a value equal to or above the display determination value to a value below the display determination value or if the standardized face evaluation value changes from a value below the display determination value to a value equal to or above the display determination value, at the time of displaying the frame indicating a face. The change from non-display to display with the lapse of time and the change from display to non-display with the lapse of time are the same in the content though they are different in the change direction. Therefore, description will be made representatively on the processing performed when the standardized face evaluation value changes from a value equal to or above the display determination value to a value below the display determination value here. Though a case may be assumed where multiple faces are detected, description will be made on the assumption that only one face has been detected to avoid complicatedness of the description. In the case of multiple faces, processing is to be performed according to the face evaluation value of each of the detected faces. For example, a frame indicating one face is kept being displayed because its face evaluation value is equal to or above the display determination value, and a frame indicating another face gradually disappears because its face evaluation value is below the display determination value. Such an operation will be understood by applying the description below to the display of each face.

Figure 23:
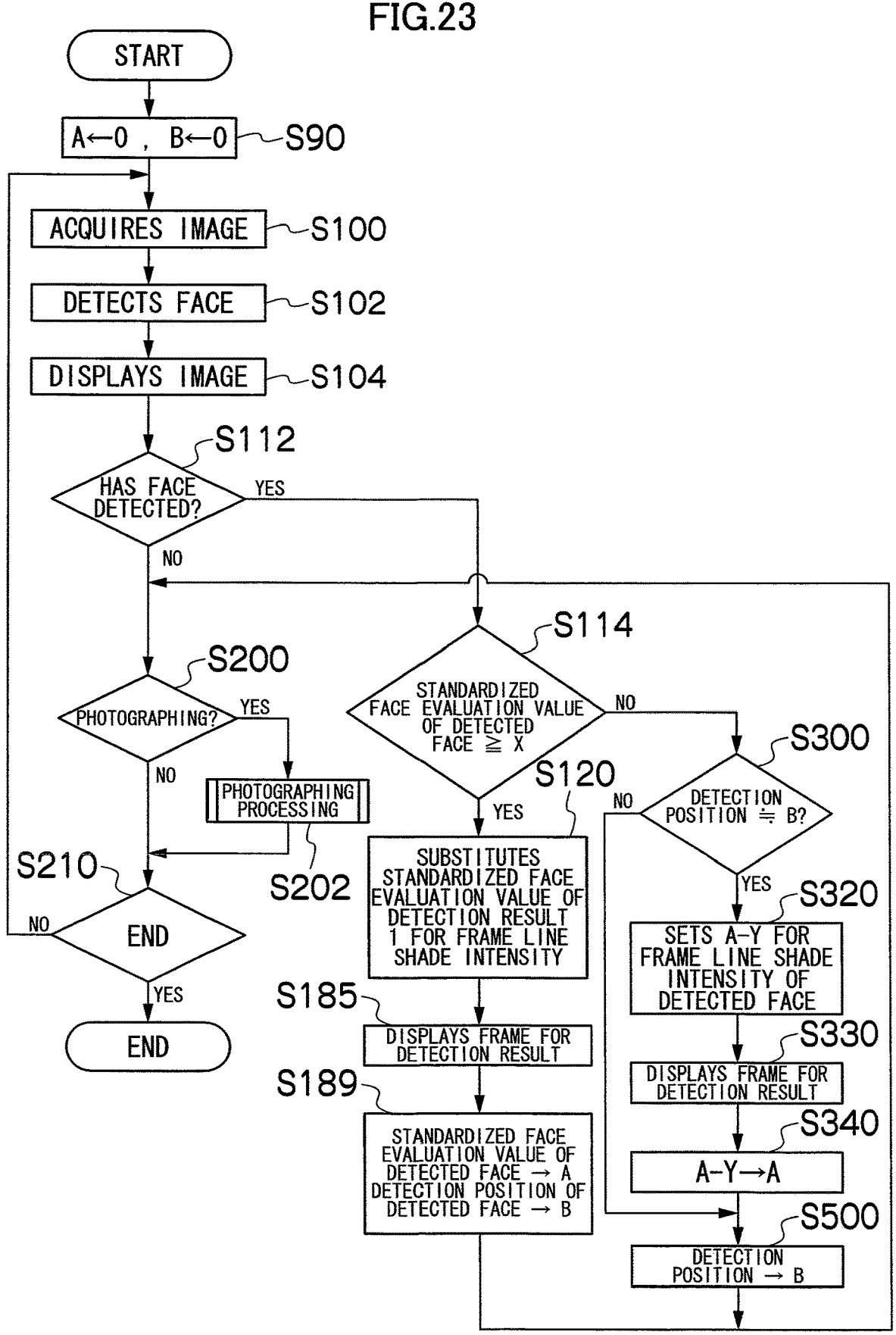
FIG. 23 is a flowchart of the CPU displaying the frame in a manner that the frame changes with the lapse of time when the face evaluation value becomes equal to or above the display determination value of the frame indicating a face or below the value.

FIG. 23 is a flowchart of the CPU 20 of causing the display of the frame indicating a face to change with the lapse of time if the standardized face evaluation value changes from a value equal to or above the display determination value to a value below the display determination value or if the standardized face evaluation value changes from a value below the display determination value to a value equal to or above the display determination value, at the time of displaying the frame indicating a face.

First, 0 is substituted for variables A and B to be used, for initialization (step S90). Then, signal processing is performed for an image signal obtained by inputting an image from or taking an image with the image input section 10, at an input signal processing section to acquire the image signal as an image (step S100). Next, at the face detection section, particular targets of a subject included in the inputted image, that is, a face, eyes, pupils, a nose, a mouth and the like are detected from the inputted image, and the feature points and patterns of them are identified to detect the face of the subject (step S102). Next, the image inputted from the image input section 10 is displayed (step S104). Next, at step S112, it is determined whether a face has been detected or not. Here, for the determination on whether a face has been detected or not, the face evaluation value may be used, or an evaluation value other than the face evaluation value may be used. If it is determined at step S112 that a face has been detected, then the flow proceeds to step S114, and otherwise, the flow proceeds to step S200.

At step S114, it is determined whether or not the standardized face evaluation value of the detected face is equal to or above a numerical value (here, X) set in advance as a lower limit for display. If the standardized face evaluation value is equal to or above X, a frame is to be displayed, and therefore, the flow proceeds to step S120. Here, the standardized face evaluation value of the detected face is substituted for the frame line shade intensity of the detection result, and a frame indicating the face is displayed at step S185. Then, at step S189, the standardized face evaluation value of the detected face and its detection position are substituted for the variables A and B, respectively, and the flow proceeds to step S200.

At step S114, if the standardized face evaluation value of the detected face is below the numerical value (here, X) set in advance as a lower limit for display, a frame is not to be displayed, and therefore, the flow proceeds to step S300.

At step S300, it is determined whether or not the detection position of the detected face is close to the variable B. If the detection position is close to the variable B, then it is determined that the detected face is the same face detected last, and the flow proceeds to step S320. If the detection position is different from the variable B, there is a possibility that a different face has been detected, and therefore, the processing is not performed, and the flow proceeds to step S500. Here, the processing of causing the frame indicating a face to disappear with the lapse of time is not performed when there is a possibility that a different face has been detected. However, there is also a possibility that the subject person has suddenly moved, and therefore, it is conceivable to omit this step S300 and perform the processing. Furthermore, though the determination is made at the position where a face has been detected, the determination may be made based on whether the face is the face detected immediately before the detection if each face can be detected. That is, it is possible that the processing for causing the frame to disappear with the lapse of time is performed if the face is the same face detected immediately before the detection, and the processing is not performed if the face is different from the face detected immediately before the detection.

At step S320, "variable A-variable Y" is set as the shade intensity of the frame line for the detected face. Here, the frame line shade intensity is indicated between 0 and 255, and the detected face evaluation value is standardized by 255. Since the value of Y is a value which decreases the value of A with the lapse of time, it is generally a value set by the system. However, it may be set by an operator. If a face is detected immediately before the detection, a standardized face evaluation value has been substituted for A. Therefore, by calculating A-Y, the frame line shade intensity of a new frame line is decreased.

Next, at step S330, a frame for the detection result is displayed. In this case, the value set at step S320 is used as the frame line shade intensity.

After that, at step S340, "A-Y" is newly substituted for the variable A, and at step S500, the face detection position is substituted for the variable B. Then, the flow proceeds to step S200.

At step S200, whether or not to perform photographing is determined. Commonly, the determination is made based on whether the shutter button or the recording button (either of them is not shown) provided on the operation section 26 has been pressed or not. When the photographing processing is to be performed, the photographing processing is performed at step S202, and then, the flow proceeds to step S210. When the photographing processing is not to be performed, the flow proceeds to step S210, and it is determined whether or not to end the processing. If the processing is not to be ended, then the flow returns to step S100 and repeats similar processing.

Consequently, it is possible to cause the display of the frame indicating a face to change with the lapse of time if the standardized face evaluation value changes from a value equal to or above the display determination value to a value below the display determination value or if the standardized face evaluation value changes from a value below the display determination value to a value equal to or above the display determination value, at the time of displaying the frame indicating a face, and it is possible to avoid blinking of the display and smoothly display the frame indicating a face.

Here, acquisition of an image (step S100), detection of a face (step S102) and display of the image (step S104) are performed in time sequence for convenience of description with reference to the flowchart. However, it is also possible to perform display of the image (step S104) while performing detection of a face (step S102), for example, in the case of such a configuration that the face detection section operates independently from the CPU 20, and it is rather desirable in order to shorten the entire processing. Not only for the parts described above but also for the parts described below, higher speed can be realized by performing parallel processing if possible.

Here, an image is displayed on the display section 22 first, and then a frame is displayed on the display section 22. However, it is also possible to first synthesize an image and a frame to be displayed and then send the synthesized result to the display section 22 to display it thereon, depending on the configuration of the apparatus.

Furthermore, it is not necessarily required to display an image. For example, in the case of an image-taking apparatus for monitoring intended to monitor whether the face of a person exists or not, it is sufficient to display only a face frame, without displaying an image. Because it is sufficient to display the image only when it is determined necessary to do so from the displayed frame. For example, the following is conceivable. When a face is detected, a frame is displayed. Then, if the detection continues for a predetermined period of time (for example, three seconds or more), then an image is displayed for the first time. This makes it possible to monitor not a monitoring picture screen on which a lot of targets are displayed and which requires alertness but only a necessary monitoring screen.

Here, when it is determined that the frame indicating a face is to be displayed, a frame with a frame line shade intensity corresponding to the standardized face evaluation value is displayed, and when change from display to non-display occurs, the frame is displayed with the frame line shade intensity changed, with the lapse of time, from the frame line shade intensity corresponding to the standardized face evaluation value of the last display. Therefore, smooth display which does not give an uncomfortable feeling can be realized. However, this is not limiting. When the frame indicating a face is displayed, it may be displayed as in any of the embodiment described here.

First Variation Example of the Second Embodiment of Frame Display

Figure 24:
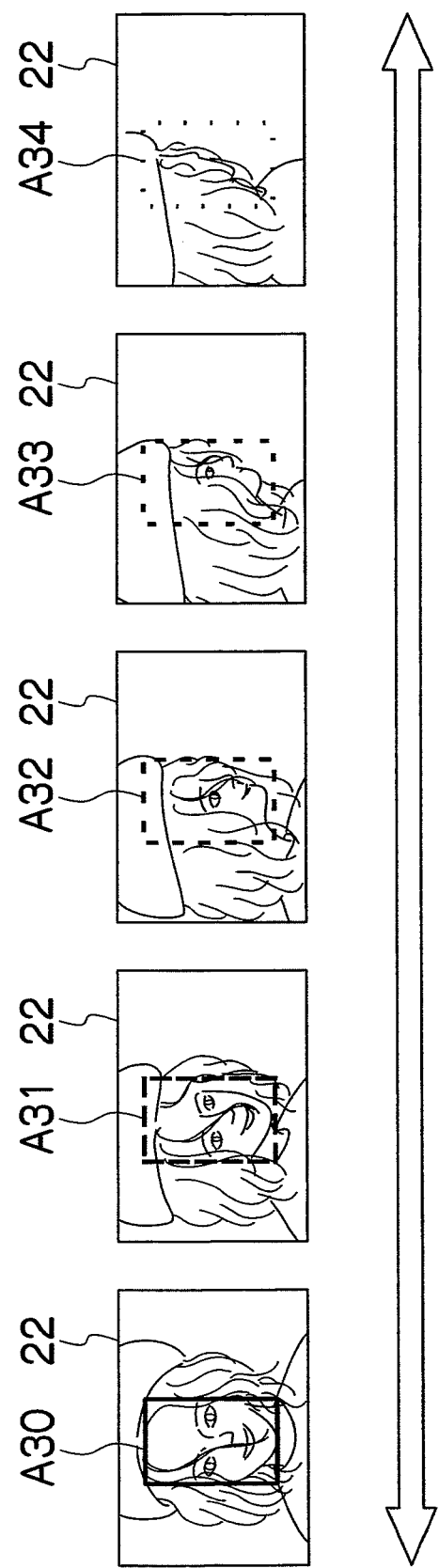
FIG. 24 shows an example where, when the face evaluation value becomes equal to or above the display determination value of the frame indicating a face or below the value, the line segment display rate of the frame is changed with the lapse of time.

FIG. 24 shows the display shown when the standardized face evaluation value changes from a value equal to or above the display determination value to a value below the display determination value or when the standardized face evaluation value changes from a value below the display determination value to a value equal to or above the display determination value, at the time of displaying the frame indicating a face on the display section 22 of the image-taking apparatus 1. If the face evaluation value becomes below the display determination value, the frame line of the frame indicating a face is displayed, with the line segment display rate of the line segments constituting the frame line changed with the lapse of time (from A30 to A34).

Figure 25:
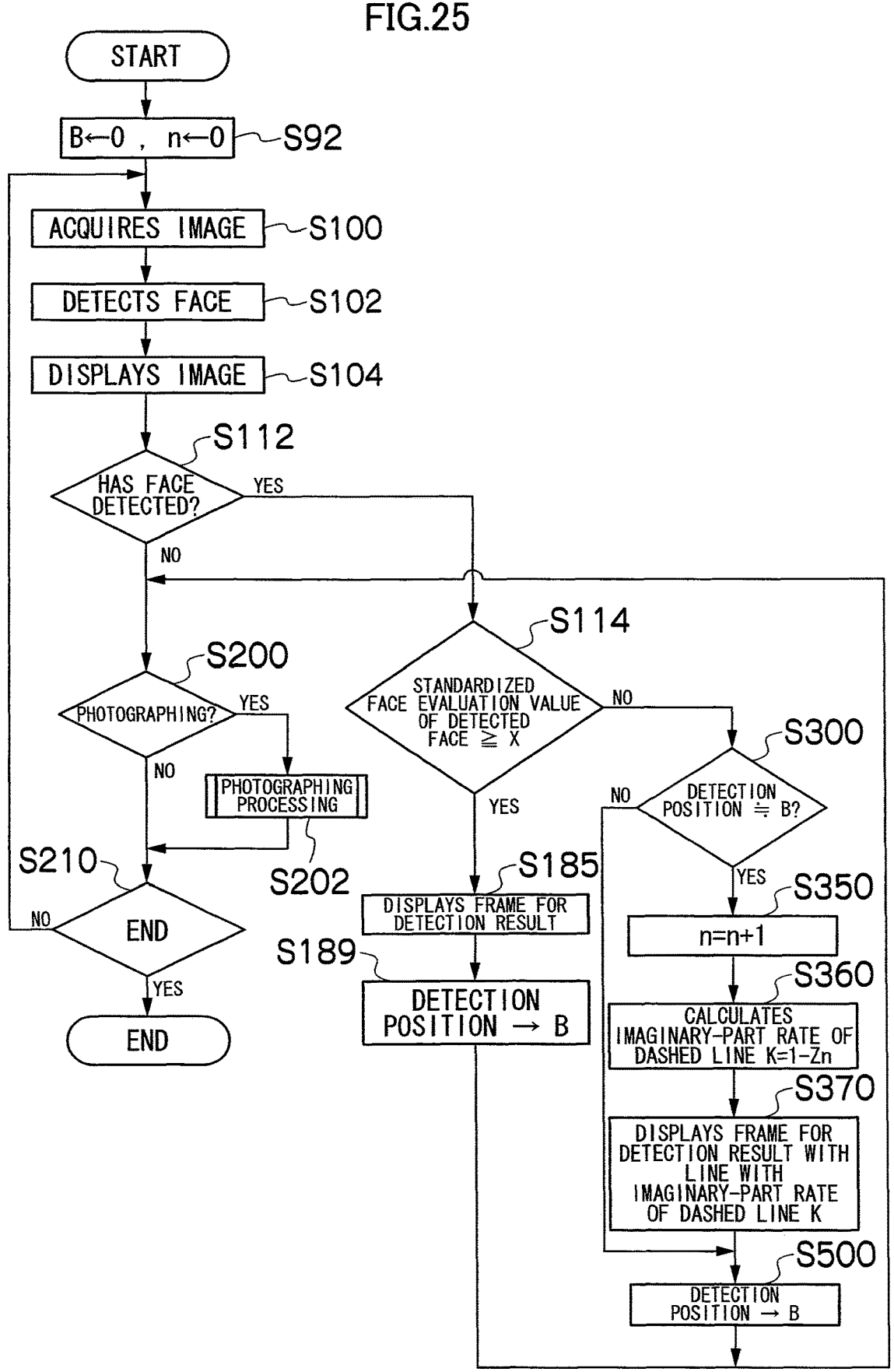
FIG. 25 is a flowchart of the CPU causing the line segment display rate of the frame to change with the lapse of time when the face evaluation value becomes equal to or above the display determination value of the frame indicating a face or below the value.

FIG. 25 is a flowchart of the CPU 20 generating a frame display indicating a face from the standardized face evaluation value and the position of a frame indicating a face, outputted from the face detection section 30, displaying it on the display section 22, and, if the standardized face evaluation value changes from a value equal to or above the display determination value to a value below the display determination value or if the standardized face evaluation value changes from a value below the display determination value to a value equal to or above the display determination value, causing the line segment display rate of the line segments constituting the frame line of the frame indicating a face to change with the lapse of time. Since this flowchart is a variation example of FIG. 23, only parts different from FIG. 23 will be described.

Acquisition of an image (step S100), detection of a face (step S102), display of the image (step S104), determination on detection of a face (step S112), determination on whether or not a standardized face evaluation value is equal to or above a display determination value (step S114), display of a frame for the detection result (step S185), update of variables (step S189), determination on whether or not to perform photographing and processing performed in the case where photographing is to be performed (steps S200 and S202) and end determination processing (step S210) are similar to those in FIG. 23.

At initialization of variables (step S92), 0 is substituted for a variable B and a variable n to initialize them.

If it is determined at step S114 that a frame is not to be displayed, determination of the detection position is made (step S300). If the detection position is close to the variable B, and it is determined that the face is the same face, then the flow proceeds to step S350. If the detection position is significantly different from the variable B, then the flow proceeds to step S500.

At step S350, 1 is added to the value of the variable n. After that, at step S360, the imaginary-part rate of dashed line is calculated. The imaginary-part rate of dashed line is calculated by K=1−Z×n. Here, n is an integer, and Z is a constant equal to or below 1. However, Z may be set by an operator. Because n is added at step S350, the imaginary-part rate of dashed line decreases every time the processing through S350 to S370 is repeated, and the display rate relative to the unit length of the frame line decreases. After that, at step S370, the frame for the detection result is displayed by a line with the imaginary-part rate of dashed line K, and at step S500, the detection position is substituted for B. Then, the flow proceeds to step S200.

As described above, it is possible to display the frame indicating a face with the imaginary-part rate of dashed line of the frame line to changed with the lapse of time if the standardized face evaluation value changes from a value equal to or above the display determination value to a value below the display determination value or if the standardized face evaluation value changes from a value below the display determination value to a value equal to or above the display determination value, at the time of displaying the frame indicating a face, and it is possible to avoid blinking of the display and smoothly display the frame indicating a face.

Though description is made on the assumption that, when it is determined that the frame indicating a face is to be displayed, a normal frame is displayed, the frame to be displayed may change according to the face evaluation value. For example, in the case of this embodiment, by indicating the imaginary-part rate of dashed line by the standardized face evaluation value when the frame indicating a face is to be displayed, and changing the numerical value of the imaginary-part rate of dashed line from the imaginary-part rate of dashed line of the last display when change from display to non-display occurs, smooth display which does not give an uncomfortable feeling can be realized.

Second Variation Example of the Second Embodiment of Frame Display

Figure 26:
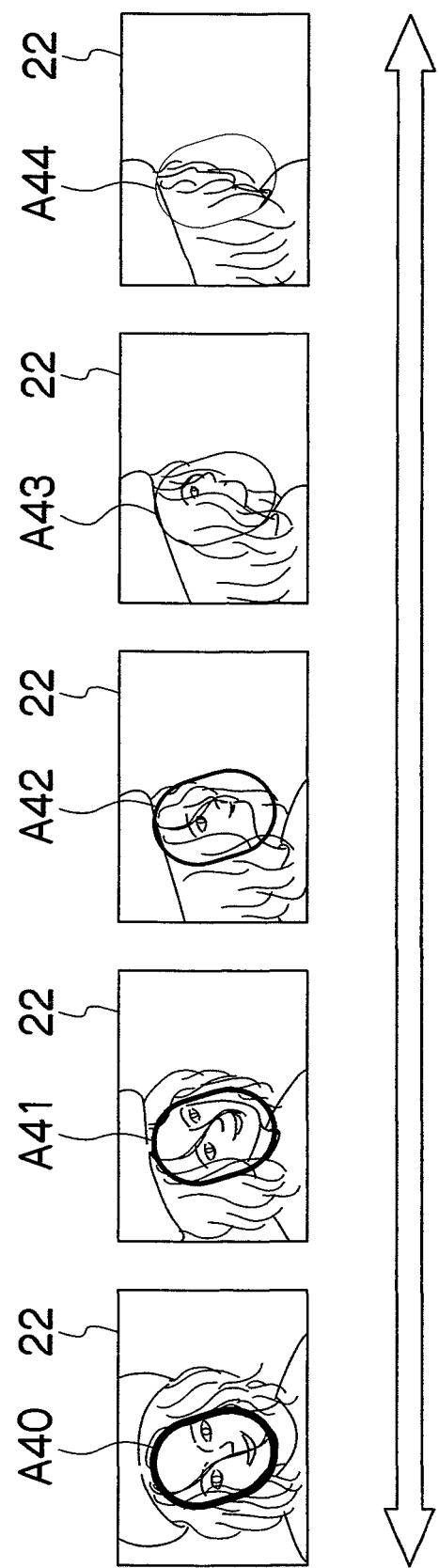
FIG. 26 shows an example where, when the face evaluation value becomes equal to or above the display determination value of the frame indicating a face or below the value, the frame line width of the frame is changed with the lapse of time.

FIG. 26 shows the display shown when the standardized face evaluation value changes from a value equal to or above the display determination value to a value below the display determination value or when the standardized face evaluation value changes from a value below the display determination value to a value equal to or above the display determination value, at the time of displaying the frame indicating a face on the display section 22 of the image-taking apparatus 1. If the face evaluation value becomes below the display determination value, the frame line of the frame indicating a face is displayed, with the frame line width changed with the lapse of time (from A40 to A44).

Figure 27:
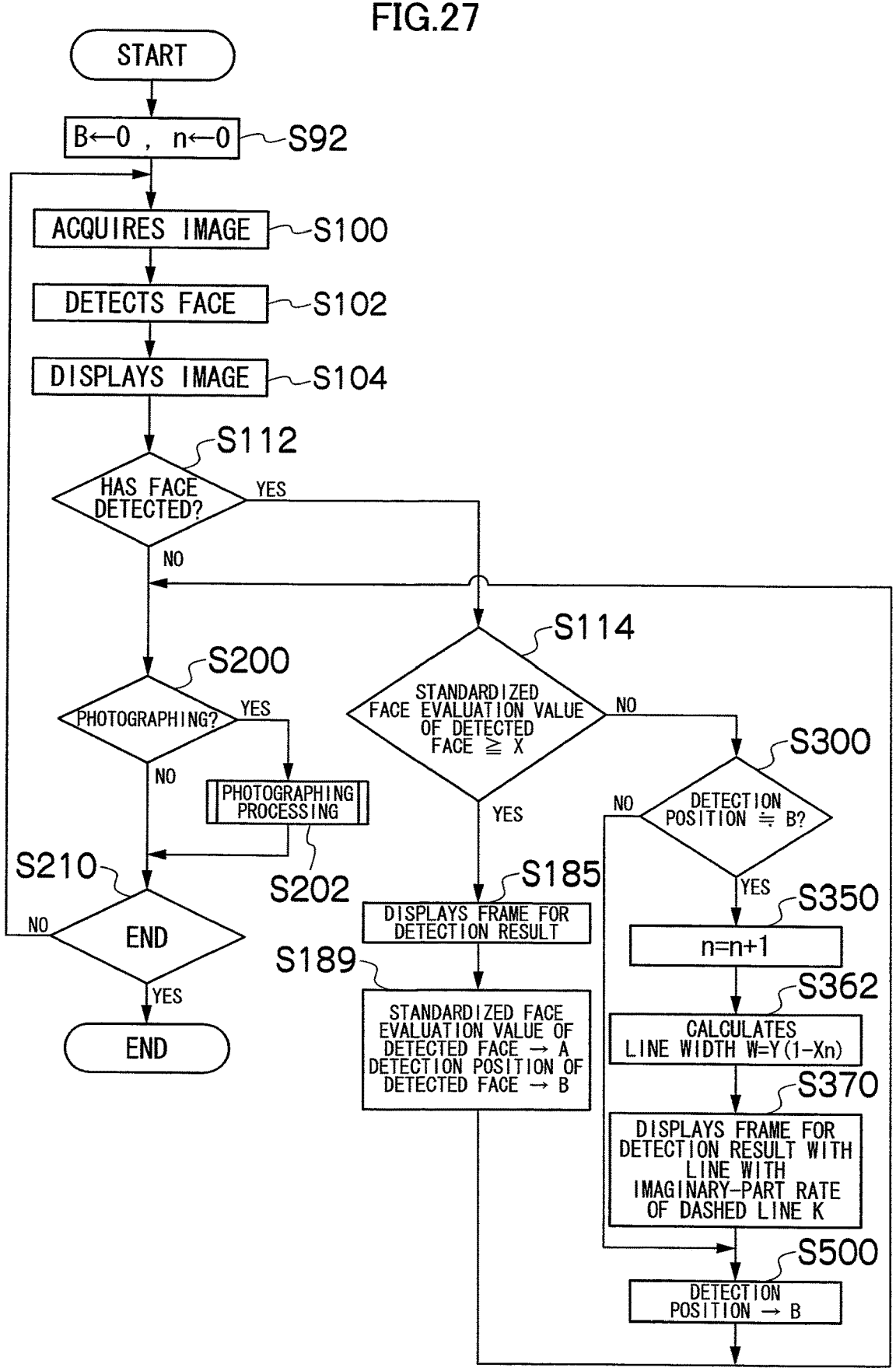
FIG. 27 is a flowchart of the CPU causing the frame line width of the frame to change with the lapse of time when the face evaluation value becomes equal to or above the display determination value of the frame indicating a face or below the value.

FIG. 27 is a flowchart of the CPU 20 generating a frame display indicating a face from the standardized face evaluation value and the position of a frame indicating a face, outputted from the face detection section 30, displaying it on the display section 22, and, if the standardized face evaluation value changes from a value equal to or above the display determination value to a value below the display determination value changes from a value below the display determination value to a value equal to or above the display determination value, causing the frame line width of the frame indicating a face to change with the lapse of time. Since this flowchart is a variation example of FIG. 25, only parts different from FIG. 25 will be described.

Initialization of variables (step S92), acquisition of an image (step S100), detection of a face (step S102), display of the image (step S104), determination on detection of a face (step S112), determination on whether or not a standardized face evaluation value is equal to or above a display determination value (step S114), display of a frame for the detection result (step S185), update of variables (step S189), determination on whether or not to perform photographing and processing performed in the case where photographing is to be performed (steps S200 and S202) and end determination processing (step S210) are similar to those in FIG. 25.

Determination of the detection position (step S300), increment of the variable n (step S350) in the case where the detection position is determined to be close to the variable B, and substitution of the detection position for the variable B (step S500) performed in the case where the detection position is not determined to be close and after display of the frame, which is to be described later, are similar to those in FIG. 25.

After the increment of the variable n (step S350), a line width W is calculated at step S362. The line width is calculated by W=Y×(1−X×n). Here, Y is a reference line width, n is an integer, and X is a constant equal to or below 1. Y may be expressed as a maximum line width. Y and X may be set by an operator. Because n is added at step S350, the line width W decreases every time the processing through S350 to S370 is repeated, and the frame line gradually thins down. After that, at step S370, the frame for the detection result is displayed with the line width W, and at step 500, the detection position is substituted for B. Then, the flow proceeds to step S200.

As described above, it is possible to cause the frame line width of the frame indicating a face to change with the lapse of time if the standardized face evaluation value changes from a value equal to or above the display determination value to a value below the display determination value or if the standardized face evaluation value changes from a value below the display determination value to a value equal to or above the display determination value, at the time of displaying the frame indicating a face, and it is possible to avoid blinking of the display and smoothly display the frame indicating a face.

Third Variation Example of the Second Embodiment of Frame Display

Figure 28:
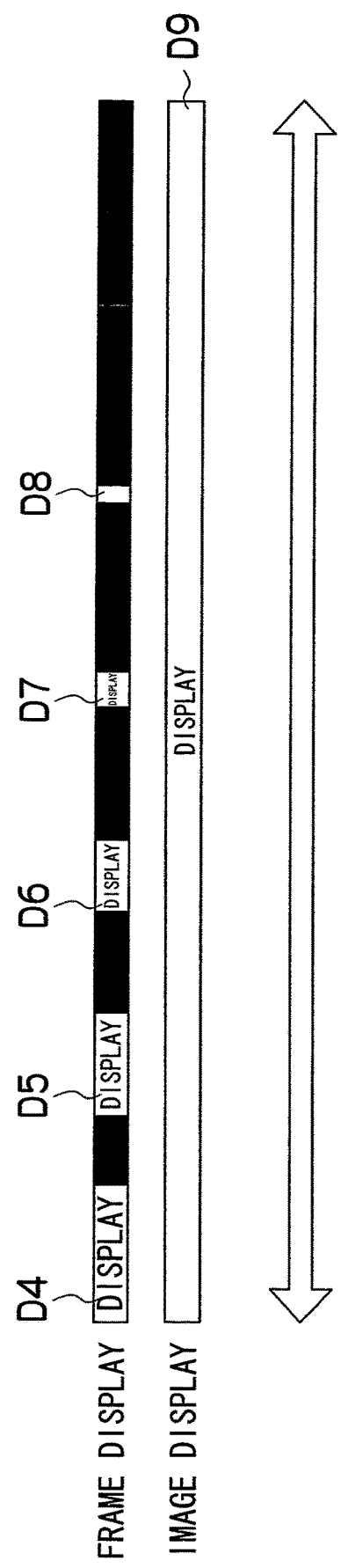
FIG. 28 shows an example where, when the face evaluation value becomes equal to or above the display determination value of the frame indicating a face or below the value, the display time rate of the frame is changed with the lapse of time.

FIG. 28 shows an example of displaying the frame indicating a face, with the display time rate of the frame indicating a face changed with the lapse of time (from D4 to D8) if the standardized face evaluation value changes from a value equal to or above the display determination value to a value below the display determination value or if the standardized face evaluation value changes from a value below the display determination value to a value equal to or above the display determination value, at the time of displaying the frame indicating a face on the display section 22 of the image-taking apparatus 1.

Figure 29:
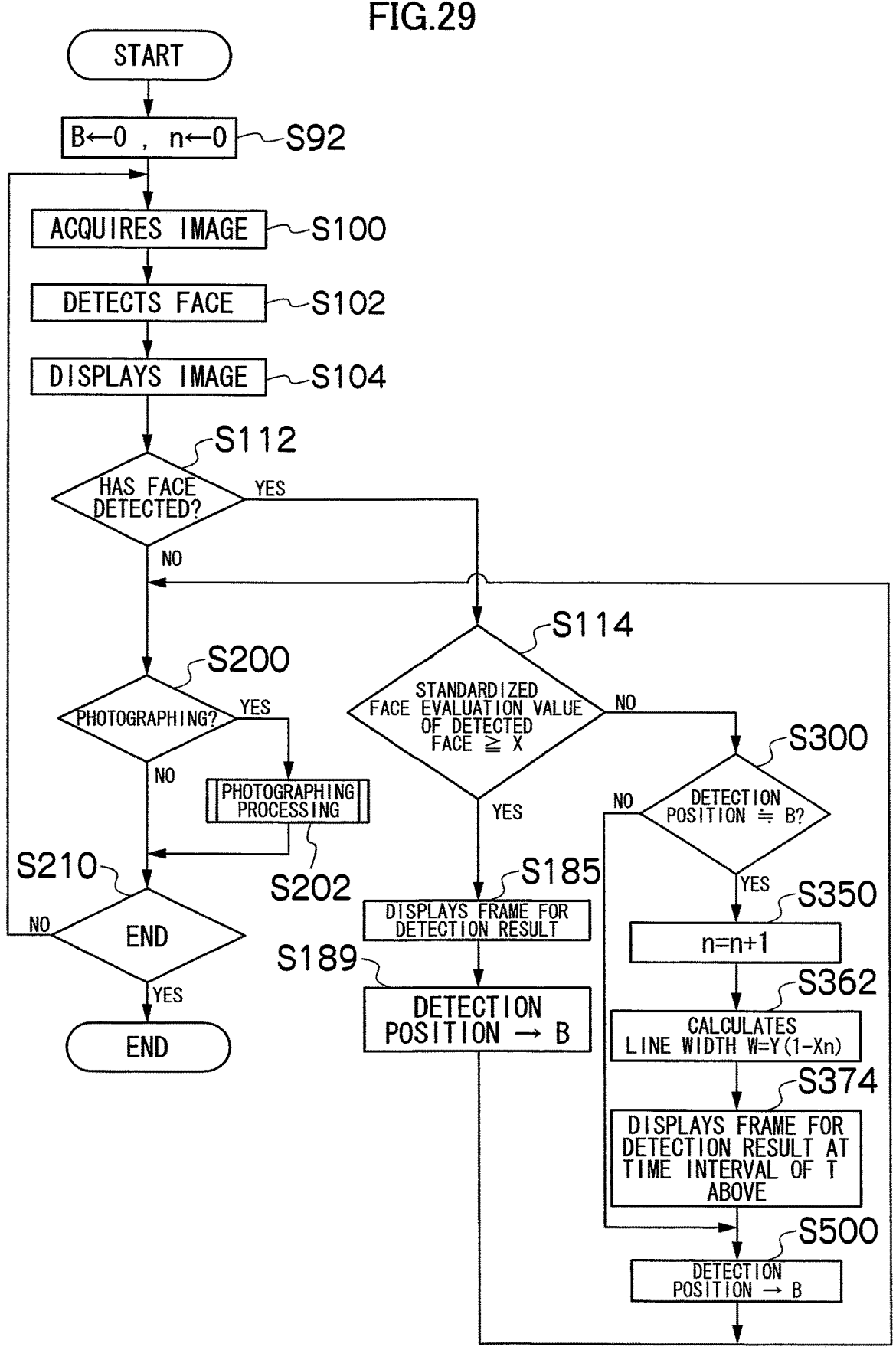
FIG. 29 is a flowchart of the CPU causing the display time rate of the frame to change with the lapse of time when the face evaluation value becomes equal to or above the display determination value of the frame indicating a face or below the value.

FIG. 29 is a flowchart of the CPU 20 generating a frame display indicating a face from the standardized face evaluation value and the position of a frame indicating a face, outputted from the face detection section 30, displaying it on the display section 22, and, if the standardized face evaluation value changes from a value equal to or above the display determination value to a value below the display determination value or if the standardized face evaluation value changes from a value below the display determination value to a value equal to or above the display determination value, causing the display time rate of the frame line of the frame indicating a face to change with the lapse of time. Since this flowchart is a variation example of FIG. 25, only parts different from FIG. 25 will be described.

Initialization of variables (step S92), acquisition of an image (step S100), detection of a face (step S102), display of the image (step S104), determination on detection of a face (step S112), determination on whether or not a standardized face evaluation value is equal to or above a display determination value (step S114), display of a frame for the detection result (step S185), update of variables (step S189), determination on whether or not to perform photographing and processing performed in the case where photographing is to be performed (steps S200 and S202) and end determination processing (step S210) are similar to those in FIG. 25.

Determination of the detection position (step S300), increment of the variable n (step S350) in the case where the detection position is determined to be close to the variable B, and substitution of the detection position for the variable B (step S500) performed in the case where the detection position is not determined to be close and after display of the frame, which is to be described later, are similar to those in FIG. 25.

After the increment of the variable n (step S350), a display time rate T is calculated at step S362. The display time rate T is calculated by T=1−U×n. Here, n is an integer, and U is a constant equal to or below 1. However, the constant U may be set by an operator. Because n is added at step S350, the display time rate decreases every time the processing through S350 to S374 is repeated, and the display time gradually decreases. After that, at step S374, the frame for the detection result is displayed with the display time rate T, and at step S500, the detection position is substituted for B. Then, the flow proceeds to step S200.

As described above, it is possible to cause the display time rate of the frame indicating a face to change if the standardized face evaluation value changes from a value equal to or above the display determination value to a value below the display determination value or if the standardized face evaluation value changes from a value below the display determination value to a value equal to or above the display determination value, at the time of displaying the frame indicating a face, and it is possible to avoid blinking of the display and smoothly display the frame indicating a face.

Fourth Variation Example of the Second Embodiment of Frame Display

Figure 30:
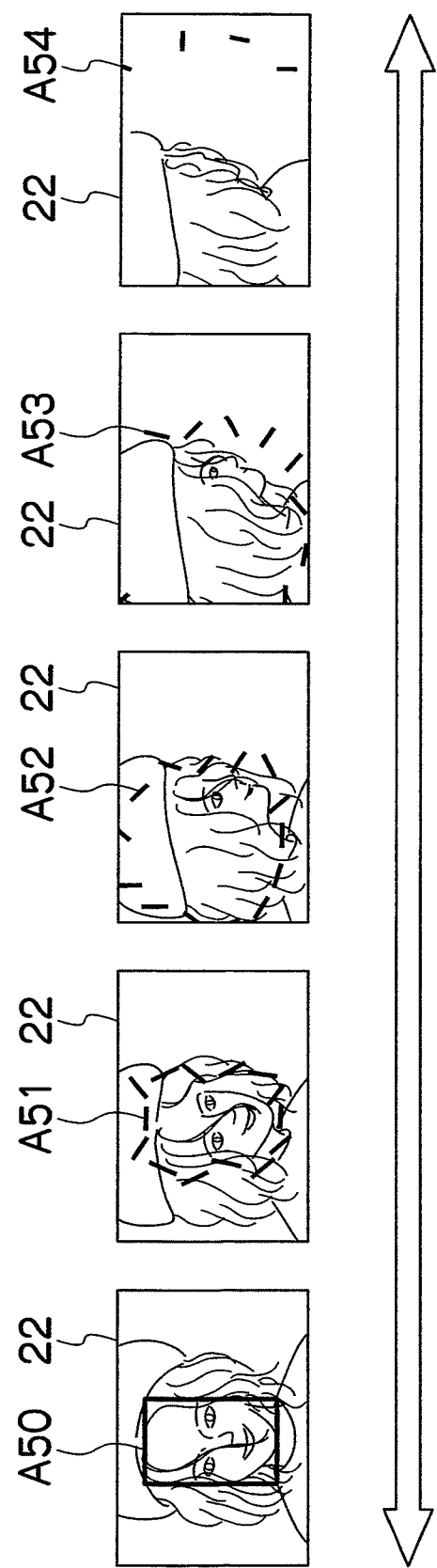
FIG. 30 shows an example where, when the face evaluation value becomes equal to or above the display determination value of the frame indicating a face or below the value, the in-screen display rate of the frame is changed with the lapse of time.

FIG. 30 shows an example of displaying the frame indicating a face, with the in-screen display rate of multiple line segments constituting the frame indicating a face changed with the lapse of time (from A50 to A54) if the standardized face evaluation value changes from a value equal to or above the display determination value to a value below the display determination value or if the standardized face evaluation value changes from a value below the display determination value to a value equal to or above the display determination value, at the time of displaying the frame indicating a face on the display section 22 of the image-taking apparatus 1. Furthermore, if the standardized face evaluation value changes to a value below the display determination value or a value equal to or above the display determination value, the in-screen display rate is changed by changing the distance of the positions of the multiple line segments of the frame indicating a face from the center of the frame according to the lapse of time from the point of time when the standardized face evaluation value changes.

As shown in FIG. 30, the frame indicating a face is displayed when the face evaluation value is equal to or above the display determination value (A50). If the face evaluation value decreases and becomes equal to or below the display determination value, the frame is separated into multiple line segments constituting the frame indicating a face, and then each line segment moves outward from the center of the frame, rotating at random, as shown in A51.

Due to such display, when change from display to non-display occurs, the frame indicating a face does not suddenly disappear but gradually disappears from the screen, and smooth display change can be realized.

It is not necessarily required that each line segment rotates. Without the rotation, the amount of calculation performed for display by the CPU 20 can be reduced advantageously. However, if each component is rotated, an impression of the frame disappearing explosively can be given. In order to give the impression of more explosive deletion, it is desirable to set the rotation direction and speed of each line segment at random and rotate each line segment in the same direction and at the same speed during the change of the display. The speed at which each line segment moves outward from the center of the frame indicating a face may be constant. The speed may be initially high and then a little lower, or it may be initially low and then a little higher. In the case of displaying the line segments moving at a constant speed, a more explosive impression can be given. In the case of displaying the line segments initially at a high speed and then at a lower speed, it is easy to express the line segments gathering from around the face when the face evaluation value decreases, becomes below the display determination value and then increases again. In the case of displaying the line segments initially at a low speed and then at a higher speed, it is possible to reduce change in the display of the frame indicating a face when the face evaluation value fluctuates around the display determination value, and smooth display can be realized.

Here, an example is shown in which multiple line segments of the frame indicating a face move outward from the center of the frame indicating a face. However, the respective line segments may move toward the center of the frame indicating a face. In this case, since there may be a face as a subject at the center, it is desirable that decrease of the shade intensity of the frame line and the like occurs as the respective line segments move toward the center.

Figure 31:
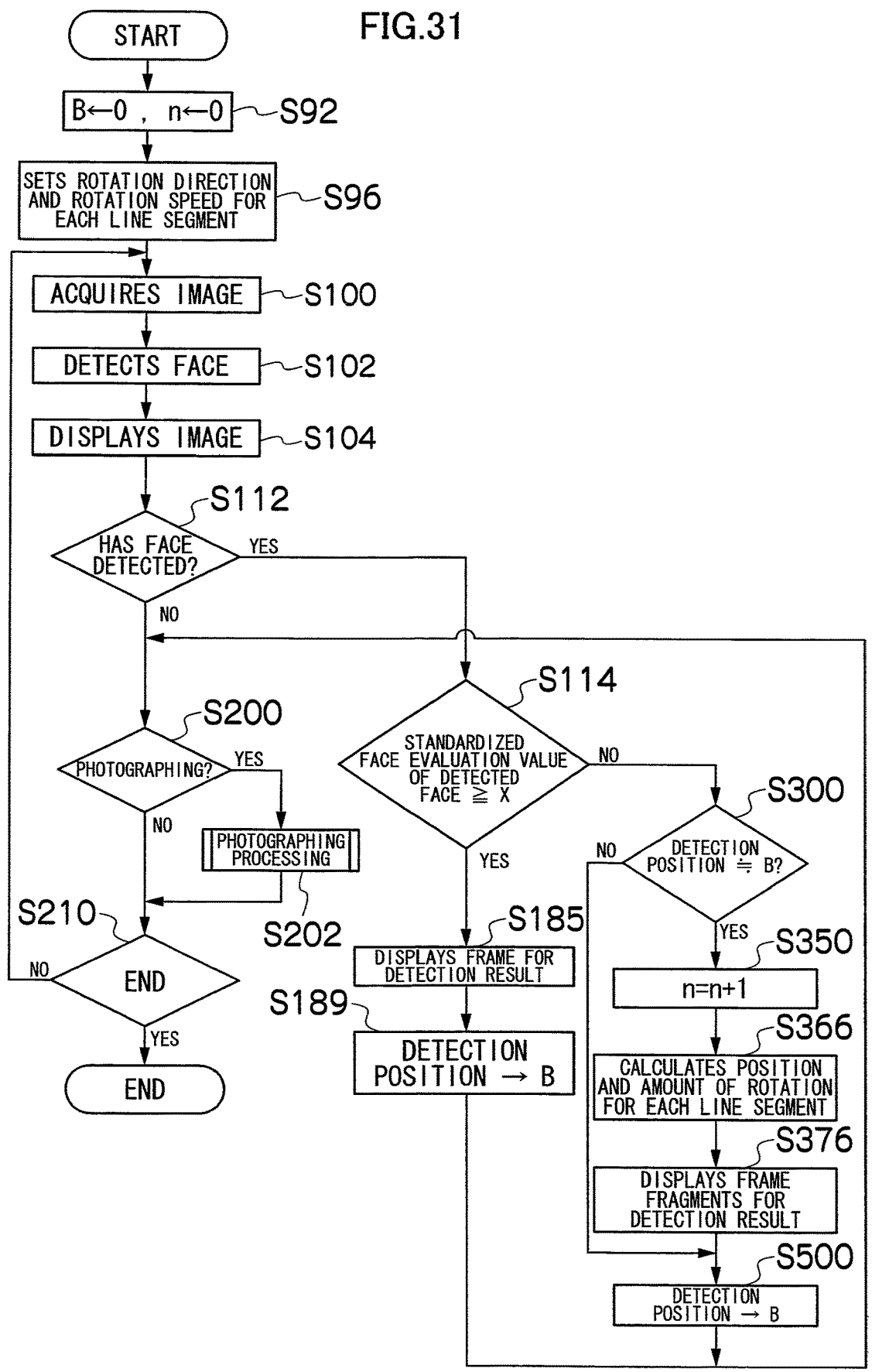
FIG. 31 is a flowchart of the CPU causing the in-screen display rate of the frame to change with the lapse of time when the face evaluation value becomes equal to or above the display determination value of the frame indicating a face or below the value.

FIG. 31 is a flowchart of the CPU 20 generating a frame display indicating a face from the standardized face evaluation value and the position of a frame indicating a face, outputted from the face detection section 30, displaying it on the display section 22, and, if the standardized face evaluation value changes from a value equal to or above the display determination value to a value below the display determination value or if the standardized face evaluation value changes from a value below the display determination value to a value equal to or above the display determination value, causing the in-screen display rate of each of the line segments constituting the frame line of the frame indicating a face to change with the lapse of time. Since this flowchart is a variation example of FIG. 25, only parts different from FIG. 25 will be described.

First, 0 is substituted for the variable B to be used, for initialization (step S92). Next, the rotation direction and the rotation speed of each line segment are set (step S96). In this embodiment, since the settings are made each time, the change in the frame is different each time, and the change in the display of the frame with the lapse of time is different each time. Therefore, a variety of displays can be provided. However, the display may be determined in advance. In this case, advantageously, the amount of calculation is reduced, and a smooth operation can be realized. Acquisition of an image (step S100), detection of a face (step S102), display of the image (step S104), determination on detection of a face (step S112), determination on whether or not a standardized face evaluation value is equal to or above a display determination value (step S114), display of a frame for the detection result (step S185), update of variables (step S189), determination on whether or not to perform photographing and processing performed in the case where photographing is to be performed (steps S200 and S202) and end determination processing (step S210) are similar to those in FIG. 25.

At step S300, determination of the detection position is made. If it is determined that the detection position is close to the variable B, then the position and the amount of rotation of each line segment are calculated at step S366. Here, the calculation is performed so that an in-screen display rate set in advance changes. However, there may be a case where, when display is switched, the in-screen display rate does not change even though the display temporarily changes (such as the change from A50 to A51 in FIG. 30). After that, at step S376, fragments of the frame are displayed. The substitution of the detection position for the variable B (step S500) after that is similar to FIG. 25.

As described above, it is possible to cause the in-screen display rate of the frame line of the frame indicating a face to change with the lapse of time if the standardized face evaluation value changes from a value equal to or above the display determination value to a value below the display determination value or if the standardized face evaluation value changes from a value below the display determination value to a value equal to or above the display determination value, at the time of displaying the frame indicating a face, and it is possible to avoid blinking of the display and smoothly display the frame indicating a face.

The frame line becomes fragments, and they gradually disappear from the screen. Thereby, effective display can be realized.

Furthermore, these variation examples can be embodied in combination with one another. FIG. 32 is an example of causing the in-screen display rate of the frame line of the frame indicating a face to change with the lapse of time and also causing the frame line shade intensity to change with the lapse of time (from A60 to A64) if the standardized face evaluation value changes from a value equal to or above the display determination value to a value below the display determination value or if the standardized face evaluation value changes from a value below the display determination value to a value equal to or above the display determination value, at the time of displaying the frame indicating a face. By combining two kinds of changes, smoother display change can be realized.

In addition, it is also possible to combine displaying the frame indicating a face continuously or by stages according to the face evaluation value and causing display to change continuously or by stages with the lapse of time if the face evaluation value becomes below the display determination value. For example, it is possible to display the frame indicating a face with a width equal to or above a predetermined line width when the face evaluation value is equal to or above the display determination value and cause the line width to decrease from the predetermined line width with the lapse of time when the face evaluation value becomes below the display determination value. Thereby, smoother display of the frame can be realized. If multiple display changes can be combined, for example, if the frame is displayed with the line width changed when the face evaluation value is equal to or above the display determination value and displayed with the frame line shade intensity and the line width changed when the face evaluation value is below the display determination value, smoother and more effective display can be realized.

Figure 33A:
FIGS. 33A, 33B, 33C, 33D, 33E, 33F, 33G and 33H show an example of the frame indicating a face and the change in the display of the frame.
Figure 33B:

Though the frame indicating a face has been described as a continuous line or a set of line segments surrounding a face in the above examples, there are other kinds of frames. FIGS. 33A, 33B, 33C, 33D, 33E, 33F 33G and 33H show an example of the frame and the change in the frame. FIG. 33A shows an example where the frame is constituted by four starts surrounding a face. In this case, it is the size that corresponds to the line width, and a frame A71 in FIG. 33A changes to a frame A72 in FIG. 33B.

Figure 33C:
Figure 33D:
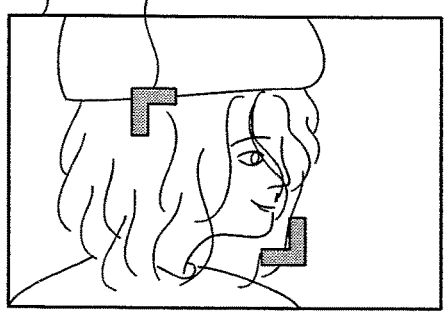

FIG. 33C shows an example of a frame which is indicated only by the upper left corner and the lower right corner of a face. Here, an example is shown where the frame is displayed with the frame line shade intensity changed from that of a frame A73 in FIG. 33C to that of a frame A74 in FIG. 33D.

Figure 33E:
Figure 33F:

FIGS. 33E and 33F show an example where hemispherical frames A75 and A76 are displayed at opposite corners of a face. FIG. 33E shows an example where the line segment display rate of the frame A75 is 100%, and FIG. 33F is an example where the line segment display rate is 20%. Because the frame is a hemisphere, the line segment direction is at right angles to the radius, and such display is shown. Here, an example is shown where the hemisphere disappears gradually starting from its center line part as the line segment display rate decreases. Reversely, the hemisphere may disappear starting from its periphery parts.

Figure 33G:
Figure 33H:
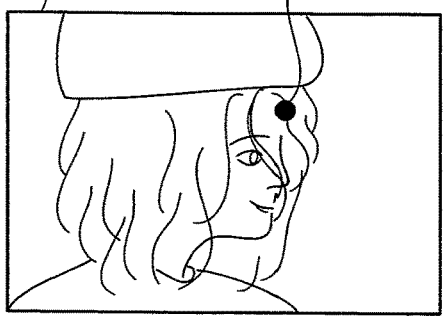
Figure 34A:
FIGS. 34A and 34B illustrate the conventional display of the frame indicating a face.
Figure 34B:

FIG. 33G shows an example where the face evaluation value is indicated by a circle A77. When the face evaluation value changes, it is indicated by change in the size as the change from the circle A77 in FIG. 33G to a circle A78 in FIG. 33H. Though the change is indicated by the size, it may be indicated by the shade intensity.

Here, description has been made on the assumption that the particular target is a face. However, the present invention is applicable to any particular target of a subject, for example, a part of a person, such as a head, eyes, pupils, red eyes, closed eyes, glasses, brows, a mouth and lips, or the whole person. Furthermore, the present invention is applicable to a lot of various targets, for example, a car, an animal and a plant such as a flower. As an example, the present invention can be used for observation of plants and may be used for an apparatus for image-taking and display of flowering and the like. Furthermore, the present invention is applicable not only to an image-taking apparatus but also to a monitoring apparatus as described above. Furthermore, a part of display may not be shown by a display section but expressed with the use of voice by a speaker section.

The invention claimed is:
1. An image display apparatus comprising:
an image-taking element that converts an optical image into an image signal;
a display that displays a display image based on the image signal; and
one or more processors configured to
  detect a face included in the image signal according to a face evaluation value indicating a feature of the face;

generate frame display information including face evaluation value information indicating whether a frame line is to be displayed surrounding the detected face;

control the display to display a frame line around the detected face based on the generated frame display information;

identify a same detected face corresponding to a same person as a previously detected face, the previously detected face being a face detected before a current face detecting process, the face evaluation value of the previously detected face being still available to the one or more processors;

control the display to erase, for the detected face identified as the same detected face, the frame line with a lapse of time;

identify a new detected face that is different from the previously detected face;

control the display to display a new frame line around the new detected face without erasing the new frame line with a lapse of time;

control the image-taking element to focus on the detected face; and repeat the face detecting process.

2. The image display apparatus according to claim 1, wherein the frame display information generated by the one or more processors causes a frame line to change according to a lapse of time from a point of time when a determination to switch from display to non-display is made or a point of time when a determination to switch from non-display to display is made.

3. The image display apparatus according to claim 1, wherein the one or more processors are further configured to control the display to display the new frame line corresponding to the face evaluation value of the new detected face.

4. An image display method comprising:
converting an optical image into an image signal;
detecting a face included in the image signal according to a face evaluation value indicating a feature of the face;
generating frame display information including a face evaluation value information indicating whether a frame line is to be displayed surrounding the detected face;
displaying a frame line around the detected face based on a comparison of the generated frame display information with a threshold;
identifying a same detected face corresponding to a same person as a previously detected face, the previously detected face being a face detected before a current face detecting process, the face evaluation value of the previously detected face being still available;
erasing the frame line, for the detected face identified as the same detected face, with a lapse of time;
identifying a new detected face that is different from the previously detected face;
displaying a new frame line around the new detected face without erasing the new frame line with a lapse of time;
controlling an image-taking element to focus on the detected face; and
repeating the face detecting process.

5. The image display method according to claim 4, wherein the generated frame display information causes a frame line to change according to a lapse of time from a point of time when a determination to switch from display to non-display is made or a point of time when a determination to switch from non-display to display is made.

6. The image display method according to claim 4, further comprising displaying the new frame line corresponding to the face evaluation value of the new detected face.

* * * * *